(12) United States Patent
Kim et al.

(10) Patent No.: US 11,779,161 B2
(45) Date of Patent: Oct. 10, 2023

(54) BLENDER AND LID FOR BLENDER CONTAINER

(71) Applicant: LG ELECTRONICS INC., Seoul (KR)

(72) Inventors: Mingyu Kim, Seoul (KR); Jinhae Ye, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 322 days.

(21) Appl. No.: 17/070,423

(22) Filed: Oct. 14, 2020

(65) Prior Publication Data

US 2021/0127905 A1 May 6, 2021

(30) Foreign Application Priority Data

Nov. 4, 2019 (KR) .................. 10-2019-0139511

(51) Int. Cl.
| | | |
|---|---|---|
| *A47J 43/07* | (2006.01) | |
| *A47J 43/046* | (2006.01) | |
| *B01F 27/808* | (2022.01) | |
| *B01F 35/45* | (2022.01) | |
| *B01F 35/30* | (2022.01) | |

(52) U.S. Cl.
CPC ......... *A47J 43/0716* (2013.01); *A47J 43/046* (2013.01); *B01F 27/808* (2022.01); *B01F 35/453* (2022.01); *B01F 2035/351* (2022.01)

(58) Field of Classification Search
CPC .. A47J 43/046; A47J 43/0716; A47J 43/0727; B65D 51/18; B65D 43/02; B65D 45/32
See application file for complete search history.

(56) References Cited

U.S. PATENT DOCUMENTS

| | | | |
|---|---|---|---|
| 5,297,473 A | 3/1994 | Thelen et al. | |
| 9,452,871 B1 * | 9/2016 | Ho ......................... | B65D 53/02 |
| 10,051,998 B2 | 8/2018 | Boozer et al. | |
| 2008/0041869 A1 | 2/2008 | Backaert | |
| 2011/0149677 A1 | 6/2011 | Davis et al. | |

(Continued)

FOREIGN PATENT DOCUMENTS

| | | |
|---|---|---|
| CN | 202518588 U | 11/2012 |
| CN | 208909913 U | 5/2019 |
| EP | 1566124 A1 | 8/2005 |

(Continued)

*Primary Examiner* — Katrina M Stransky
*Assistant Examiner* — P Derek Pressley
(74) *Attorney, Agent, or Firm* — Bryan Cave Leighton Paisner LLP

(57) ABSTRACT

A blender includes a lid configured to shield the opened upper surface of a container, in which the lid includes a main lid seated on the container and having a through-hole opened to communicate with an inside of the container, a gasket provided around the main lid and being in contact with the inner surface of the container, and an auxiliary lid inserted into the through-hole and exposed from the upper surface of the main lid, the auxiliary lid is coupled to the main lid and rotated together with the main lid in a state of being inserted into the through-hole, and the gasket protrudes to be in close contact with the inner surface of the container according to the rotational manipulation of the auxiliary lid.

16 Claims, 24 Drawing Sheets

(56) References Cited

U.S. PATENT DOCUMENTS

2015/0041577 A1    2/2015  Paget
2015/0258514 A1    9/2015  Boozer et al.

FOREIGN PATENT DOCUMENTS

| JP | 2014213878 A | * | 11/2014 | ............... | A47J 41/02 |
| JP | 2014213878 A |   | 11/2014 |                 |            |
| KR | 2019990042015 U | | 12/1999 |               |            |
| KR | 10-20170140047 A | * | 7/2016 | ............... | A47J 41/02 |

* cited by examiner

BLENDER AND LID FOR BLENDER CONTAINER

CROSS-REFERENCE TO RELATED APPLICATIONS

The present application claims priority under 35 U.S.C. 119 and 35 U.S.C. 365 to Korean Patent Application No. 10-2019-0139511, filed on Nov. 4, 2019, which is hereby incorporated by reference in its entirety.

BACKGROUND

The present disclosure relates to a blender and a lid for a blender container.

In general, a blender is a household appliance that chops food contained in a container, crushes the food into powder, or makes the food into a state such as a liquid by a blade rotated by an electric motor and is also commonly referred to as a mixer.

In a typical blender, a container is seated on an upper surface of a main body in which a motor is built, and when the container is seated, a blade inside the container is connected to a rotational shaft of the motor to be rotatable. In addition, the user can drive the motor by operating the main body after putting food in the container, and the blade is rotated by the driving of the motor to crush the food.

Such a blender has recently been developed as a large-capacity blender having a large container size, and a blender using a motor rotated at ultra-high speed to be capable of crushing various foods more effectively has been developed.

In addition, the blender may have various manipulation structures to facilitate a grinding operation of various foods.

In US Patent Publication No. 2011/0149677, an opening is formed in the center of the lid, and a cap for opening and closing the opening in the center is formed. The user may open the cap without opening the lid to add food to the inside of the container or take action. The cap may completely shield the opening of the lid so that food inside the container does not splash out.

In addition, a blender in which a gasket is provided on the circumference of the lid to allow the opened upper surface of the container to be sealed by the gasket when the lid is mounted on the container is disclosed.

If the container is shielded to be completely sealed by the lid, there is a problem that food inside the container are scattered during the grinding process by a blade rotating at a high speed or the lid or cap is opened by pressure within the container.

In U.S. patent Ser. No. 10/051,998, a container of a blender is disclosed whose opened upper surface is shielded by a lid. In addition, the lid may be fixedly mounted on the upper end of the container and fixed by a separate fixing member to prevent the lid from being opened unintentionally or food inside the container from being scattered and splashed to the outside.

However, since such a structure is a structure to open and close the lid through manipulation of a separate fixing member, there may be a problem in that the use thereof is cumbersome and the outer appearance thereof is no aesthetically pleasing.

SUMMARY

This Summary is provided to introduce a selection of concepts in a simplified form that are further described below in the Detailed Description. This Summary is not intended to identify all key features of the claimed subject matter, nor is it intended to be used alone as an aid in determining the scope of the claimed subject matter.

An object of an embodiment of the present disclosure is to provide a blender and a lid for a blender container which are easily detachable and have improved convenience in use.

An object of an embodiment of the present disclosure is to provide a blender and a lid for a blender container which allow the gasket to be in close contact with the inside of the container by a simple operation of the lid so that the lid can be selectively constrained.

An object of an embodiment of the present disclosure is to provide a blender and a lid for a blender container which are capable of improving the adhesion performance of the lid while maintaining a clean outer appearance of the container.

An object of an embodiment of the present disclosure is to provide a blender and a lid for a blender container which are capable of improving airtightness between the lid and the inner surface of the container through a rotational manipulation of the lid.

An object of an embodiment of the present disclosure is to provide a blender and a lid for a blender container which are easy to clean and easy to service when parts are broken by allowing easy disassembly and assembly of the lid itself.

A blender according to the present embodiment may include a container, a main lid which is detached from and attached to an opened upper surface of the container to open and close the container, an auxiliary lid which shields a through-hole of the lid, and a gasket which is formed around the main lid and is sealed by being in contact with the container, in which the gasket may protrude selectively to selectively seal a space between the container and the lid according to the user's manipulation of the auxiliary lid.

A container lid of a blender according to the present embodiment may include an upper body, a handle provided on the upper body, a lower body coupled to the upper body to be capable of rotating, lifting, and lowering, a gasket fixing member between the upper body and the lower body, and a gasket having an upper end and a lower end fixed to the gasket fixing member and the lower body, in which the gasket selectively protrude outwardly so that the lid may be pressed against and constrained to the inner surface of the container while the lower body lifts and lowers according to a rotational manipulation of the upper body.

A blender according to the present embodiment includes a container, a lid which is inserted into the opened upper surface of the container, and a gasket provided on the circumference of the lid, in which the gasket may protrude to the outside by the user's manipulation to be in close contact with the container inner surface in a state where the lid is inserted into an open upper surface of the container.

A blender according to the present embodiment may include a container, a lid which is inserted into the opened upper surface of the container, and a gasket provided on the circumference of the lid, in which, when the main lid is rotated, the gasket may protrude to the outside to make the lid and the inner surface of the container more airtight.

A blender according to the present embodiment may include a blender main body provided with a motor assembly, a container of which an upper surface is opened to form a space in which food is received and which seats on the blender main body, a blade device mounted to penetrate the bottom surface of the container and connected to the motor assembly to be rotated when the container is seated, and a lid configured to shield the opened upper surface of the container, in which the lid may include a main lid seated on the container and having a through-hole opened to communicate with an inside of the container, a gasket provided around the main lid and being in contact with the inner surface of the container, and an auxiliary lid inserted into the through-hole and exposed from the upper surface of the main lid, the auxiliary lid may be coupled to the main lid and rotated together with the main lid in a state of being inserted into the through-hole, and the gasket may protrude to be in close contact with the inner surface of the container according to the rotational manipulation of the auxiliary lid.

A rotation protrusion may protrude from inside the through-hole, and a rotation groove into which the rotation protrusion is inserted to constrain the auxiliary lid may be formed on the circumference of the auxiliary lid.

The rotation groove may be opened from a lower end of the outer surface of the auxiliary lid and extend in the insertion direction of the auxiliary lid.

A lid rib protruding outward may be formed around the auxiliary lid, a rib seating portion on which the lid rib is seated may be formed on an upper end of the through-hole, and the upper surface of the auxiliary lid may protrude upward more than the upper surface of the main lid in a state where the lid rib is seated on the rib seating portion.

A vent hole may be opened in the lid rib corresponding to the position of the rotation groove to allow air inside the container to be discharged to the outside.

The main lid may include an upper body forming an upper portion of the main lid, a lower body forming a lower portion of the main lid and coupled to the upper body to be capable of rotating and moving relative to each other, and a gasket fixing member formed in a ring shape and provided between the lower body and the upper body, and in which the gasket may have an upper end which is constrained around the gasket fixing member and a lower end which is constrained around the lower body to be compressed or extended according to lifting and lowering of the lower body.

A lifting and lowering protrusion protruding inward may be formed on an inner surface of the upper body, and a lifting and lowering guide that is formed to be inclined and guides the lifting and lowering protrusion when the upper body rotates to lift and lower the lower body may be provided on an outer surface of the lower body.

A plurality of lifting and lowering protrusions and a plurality of lifting and lowering guides may be respectively formed, and each lifting and lowering protrusion and each lifting and lowering guide may be formed at opposite positions to each other.

The lifting and lowering guide may include an inclined portion extending obliquely along the circumference of the lower body, an upper horizontal portion extending horizontally with the upper surface of the lower body at the upper end of the inclined portion, and a lower horizontal portion extending horizontally with the upper surface of the lower body at the lower end of the inclined portion.

The lifting and lowering guide may include an inclined portion extending obliquely along the circumference of the lower body, an upper constraining portion protruding downward from the upper end of the inclined portion and constraining downward movement of the lifting and lowering protrusion, and a lower constraining portion protruding downward from the lower end of the inclined portion and constraining the upward movement of the upper protrusion.

A first side rib and a second side rib extending in the vertical direction may be formed at the opposite ends of the lifting and lowering guide, and a rib opening may be formed on the second side rib so that the lifting and lowering protrusion can enter and exit.

A protrusion movement passage which is opened at an upper end of the lower body and communicates with the rib opening to guide movement of the lifting and lowering protrusion when the upper body and the lower body are assembled may be formed on a side of the second side rib.

The gasket fixing member may be formed in a ring shape and may support the lower end of the upper body.

The gasket fixing member may include a fixing member circumferential portion extending in the vertical direction along the circumference of the upper body to form a circumferential surface of the main lid, and a fixing member coupling portion supporting the upper body at a lower end of the fixing member circumferential portion and to which the upper end of the gasket is fixed.

The gasket may include a gasket upper portion coupled to the gasket fixing member, a gasket lower portion located below the gasket upper portion and coupled to the lower body, and a central portion extending in the vertical direction and connecting the end portions of the gasket upper portion and the gasket lower portion.

A gasket groove which is recessed along the central portion so that the central portion protrudes outward when the gasket is compressed may be formed on the inner surface of the gasket.

A pair of auxiliary gasket grooves recessed along the upper end and the lower end of the central portion may be formed on the inner surface of the gasket, and the gasket groove may be positioned between the pair of auxiliary gasket grooves.

A lid for a blender container for opening and closing an opened upper surface of the container seated on the blender according to an embodiment of the present disclosure may include an upper body forming an upper portion of the lid of a blender container, a handle provided on an upper surface of the upper body and manipulated by a user for rotation of the upper body, a lower body coupled to the upper body from a lower side of the upper body and lifted and lowered according to the rotation of the upper body, a gasket fixing member provided between the lower body and the upper body, and a gasket having an upper end fixed to the gasket fixing member and a lower end fixed to the lower body, in which the gasket may protrude according to the lifting and lowering of the lower body and may be pressed against and is in contact with the inner surface of the container.

The upper body may be formed with a through-hole communicating with the inside of the container, and the handle may be inserted into the through-hole to shield the through-hole.

The lid for the blender container may further include a lifting and lowering protrusion protruding from the inner surface of the upper body, and a lifting and lowering guide extending obliquely along the outer surface of the lower body and lifting and lowering the lower body by moving in a state of being in contact with the lifting and lowering protrusion when the upper body is rotated.

A blender and a lid for a blender container according to an embodiment of the present disclosure can be expected the following effects.

The blender according to the present embodiment has a structure in which the gasket of the blender lid can be selectively in close contact with the inside of the container by a simple rotational manipulation of the user. In other words, when the auxiliary lid is not rotated, the lid can be easily separated from and mounted on the container without being in close contact with the container, thereby improving the convenience in use.

In addition, the gasket protrudes by simple manipulation of rotating the auxiliary lid in a state where the lid is closed on the upper surface of the container so that the container and the lid can be tightly sealed. Therefore, there is an advantage that the airtightness of the container using the lid is made easier, and the convenience in use can be further improved.

In addition, without the configuration of protruding to the outside of the container or added to the outside of the container, the gasket of the lid mounted on the inside of the container is selectively protruded so that the space between the container and the lid is sealed, and thus there is an advantage of being capable of being more concise in the outer appearance of the container and preventing the outer appearance from being inhibited by the lid constraining structure.

At the same time, it is possible to ensure the airtightness of the space between the container and the lid and the fixing of the lid by selectively protruding the gasket of the lid without having a separate constraining structure in the container, and thus there is an advantage in that the lid can be securely fixed together with the improvement of outer appearance.

In addition, by allowing the gasket to selectively protrude through the rotational operation of the handle formed on the upper surface of the lid so that the user can hold the handle, there is an advantage of enabling selective airtightness of the lid without additional configuration for manipulation.

In addition, the lid is composed of a main lid for opening and closing the container, and an auxiliary lid for shielding the through-hole of the main lid, and the auxiliary lid is configured to rotate the upper body of the main lid for a selective protrusion manipulation of the gasket in a state of being mounted on the through-hole. In other words, the auxiliary lid can be a handle which can access to the container through opening and closing of the through-hole and can rotate the upper body at the same time. Therefore, there is an advantage of improving the convenience in use and allowing the structure of the lid to be maintained concisely.

In addition, the gasket is fixed to the gasket fixing member and the lower body, respectively, and when the upper body is rotated, the lower body is moved in the vertical direction so that the gasket is extended or compressed to selectively protrude to the outside of the lid. In other words, in a state where the lid is mounted, a simple rotational manipulation of the upper body allows the gasket to be pressed against and be in close contact with the inner surface of the container, thereby improving the airtightness of the space between the lid and the container.

In addition, the gasket is formed with a central portion between the upper end and the lower end, and a gasket groove is formed along the inner surface of the gasket corresponding to the central portion to more easily protrude the central portion of the gasket when the gasket is compressed, and thus there is an advantage of being capable of further improving the pressure adhesion performance of the lid.

In addition, the upper body and the lower body constituting the main lid has a constrained structure by a lifting and lowering protrusion and a lifting and lowering guide without separate screw coupling or an adhesive structure, and the lifting and lowering protrusion is configured to enter and exit the rib opening and the protrusion movement passage so that the upper body and the lower body is easily separated. In addition, the gasket fixing member for fixing the gasket also has an advantage of improving service performance by allowing easy separation and replacement by having an assembly structure by simple support without a separate screw coupling or adhesive structure.

In particular, due to the nature of the structure of the main lid which is rotated, lifted, and lowered, problems that foreign matter may be caught between the upper body, the lower body, and the gasket may be generated, or the like, but the upper body, the lower body, and the gasket fixing member have a structure which can be easily separated and coupled, and thus an advantage that the convenience in use, cleaning, and hygiene can be improved can be expected.

DETAILED DESCRIPTION

Figure 1:
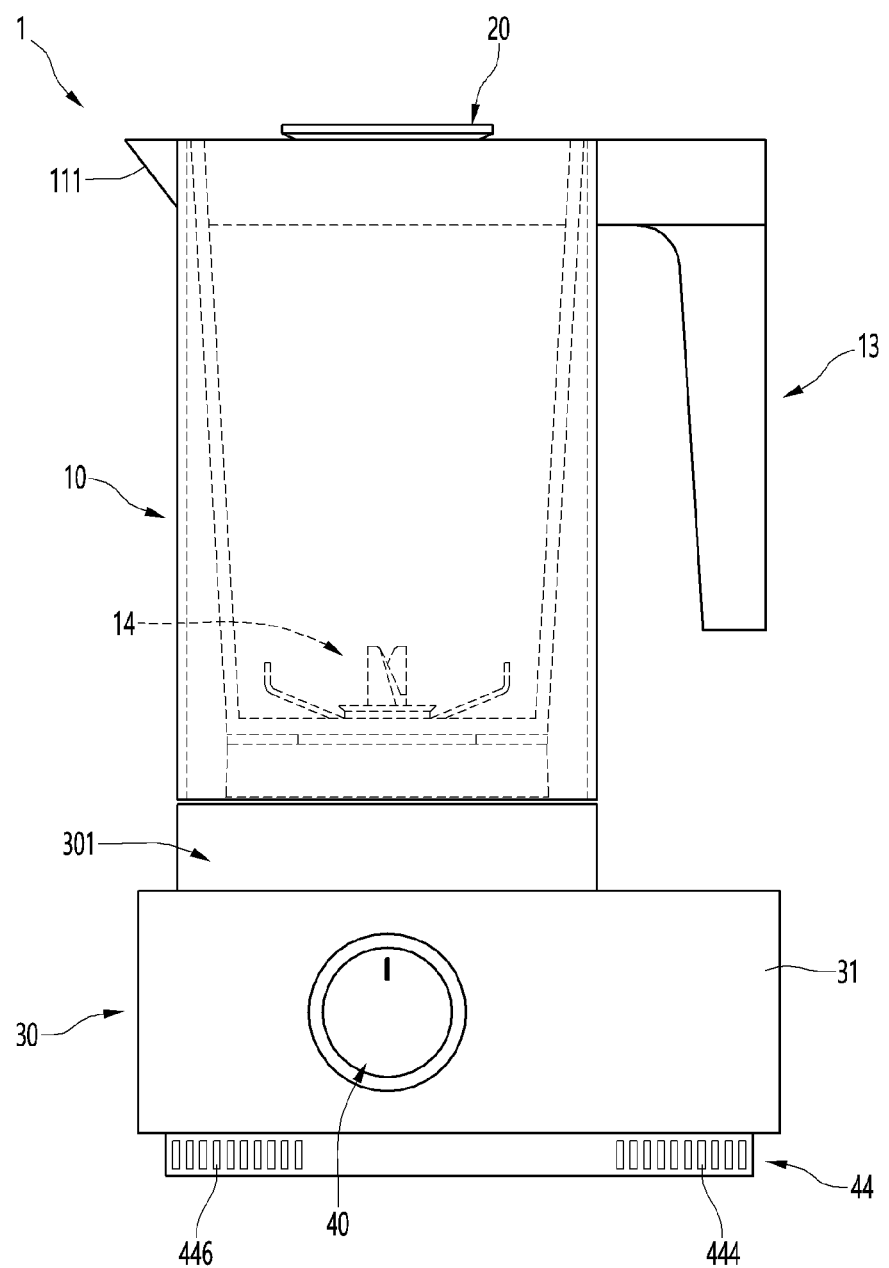
FIG. 1 is a front view illustrating a blender according to an embodiment of the present disclosure.

For simplicity and clarity of illustration, elements in the figures are not necessarily drawn to scale. The same reference numbers in different figures may denote the same or similar elements, and as such may perform similar functionality. Also, descriptions and details of well-known steps and elements may be omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Spatially relative terms, such as "beneath," "below," "lower," "under," "above," "upper," and the like, may be used herein for ease of explanation to describe one element or feature's relationship to another element or feature as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented for example, rotated 90 degrees or at other orientations, and the spatially relative descriptors used herein should be interpreted accordingly.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may include one or more elements in the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, specific embodiments of the present disclosure will be described in detail with the accompanying drawings. However, the present disclosure may not be limited to the embodiments in which the spirit of the present disclosure is presented, and it is possible to easily propose another embodiment including within the scope of another related disclosure or the present disclosure by adding, changing, or deleting another component.

Figure 2:
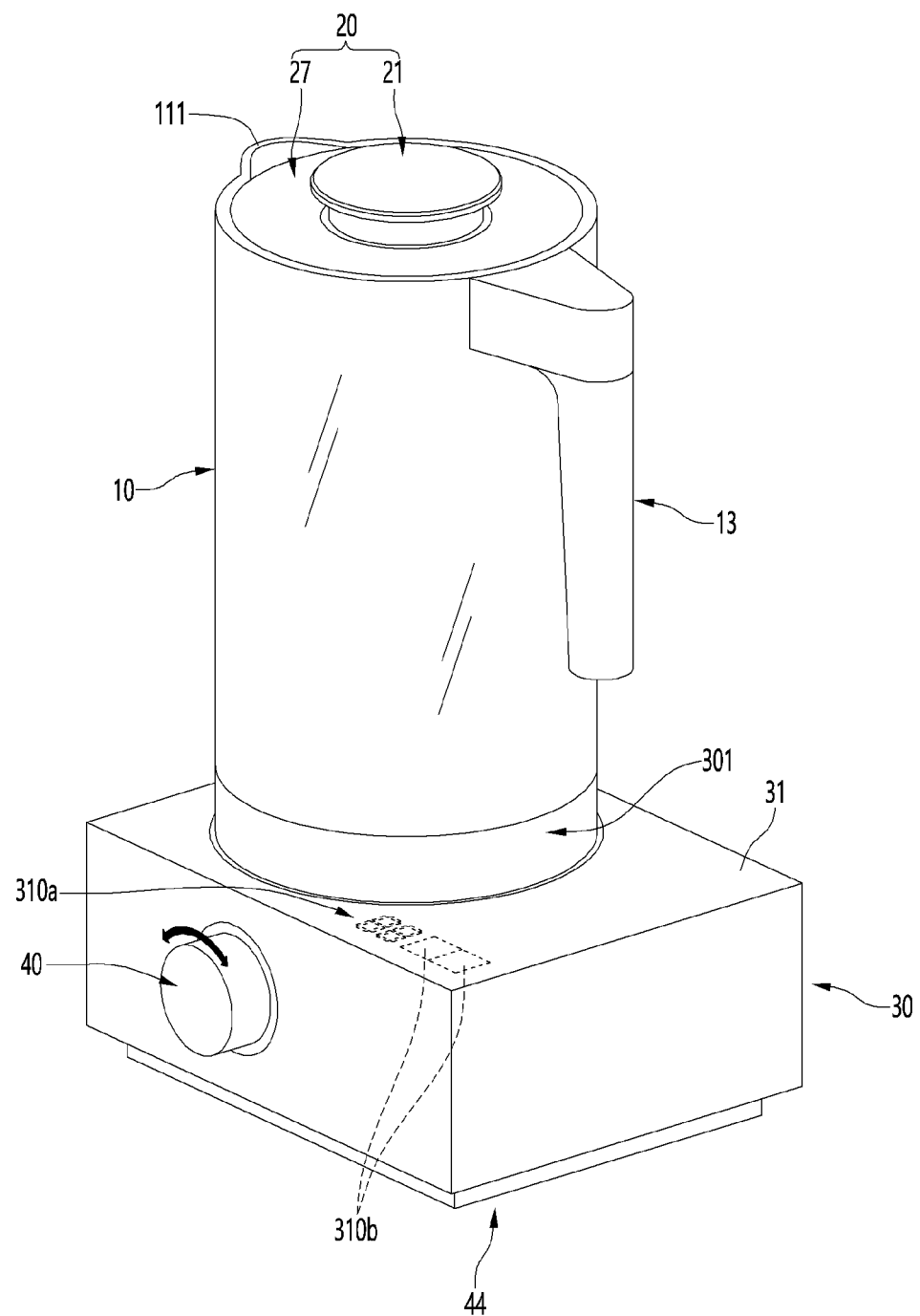
FIG. 2 is a perspective view illustrating the blender.
Figure 3:
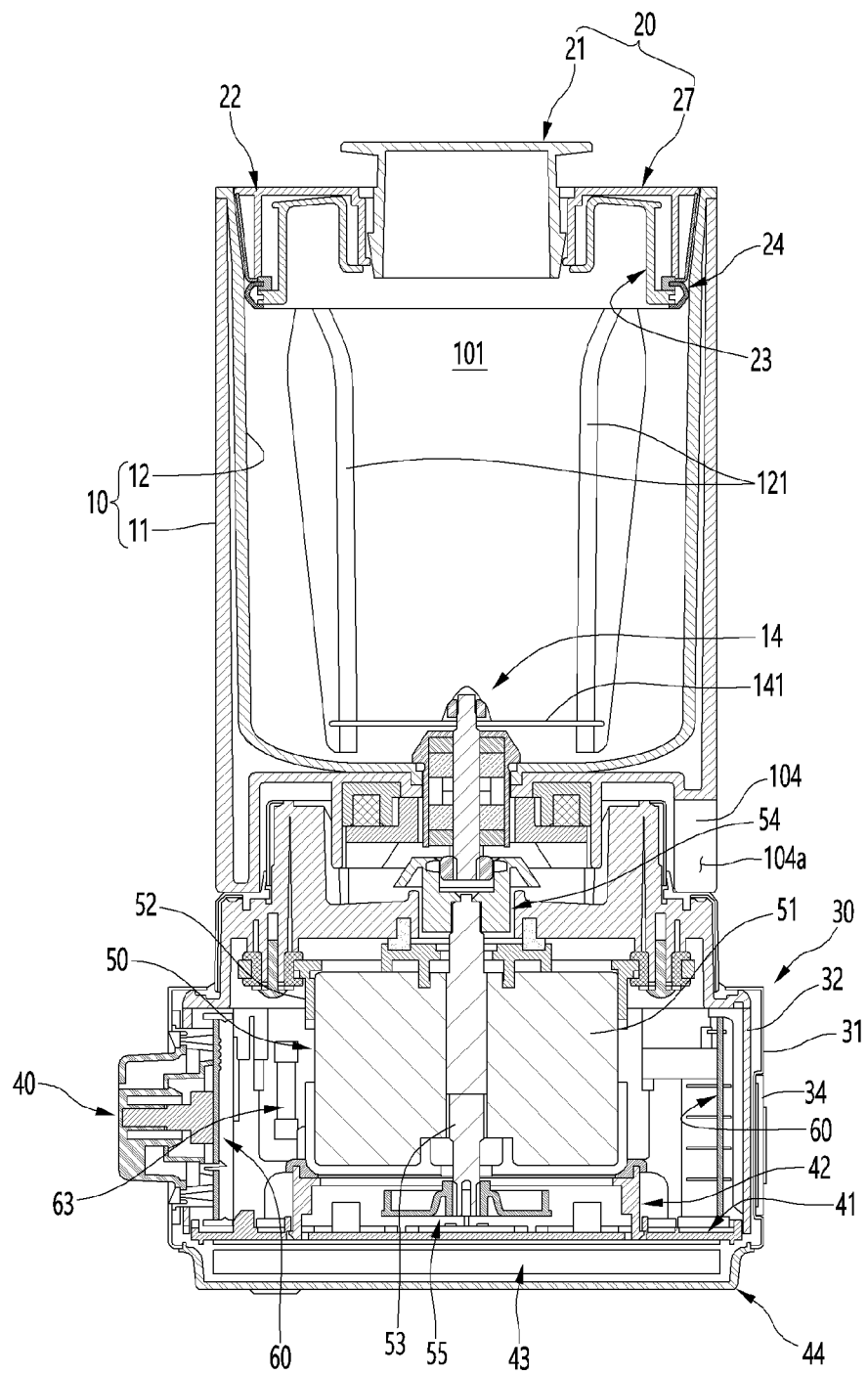
FIG. 3 is a longitudinal cross-sectional view illustrating the blender.
Figure 4:
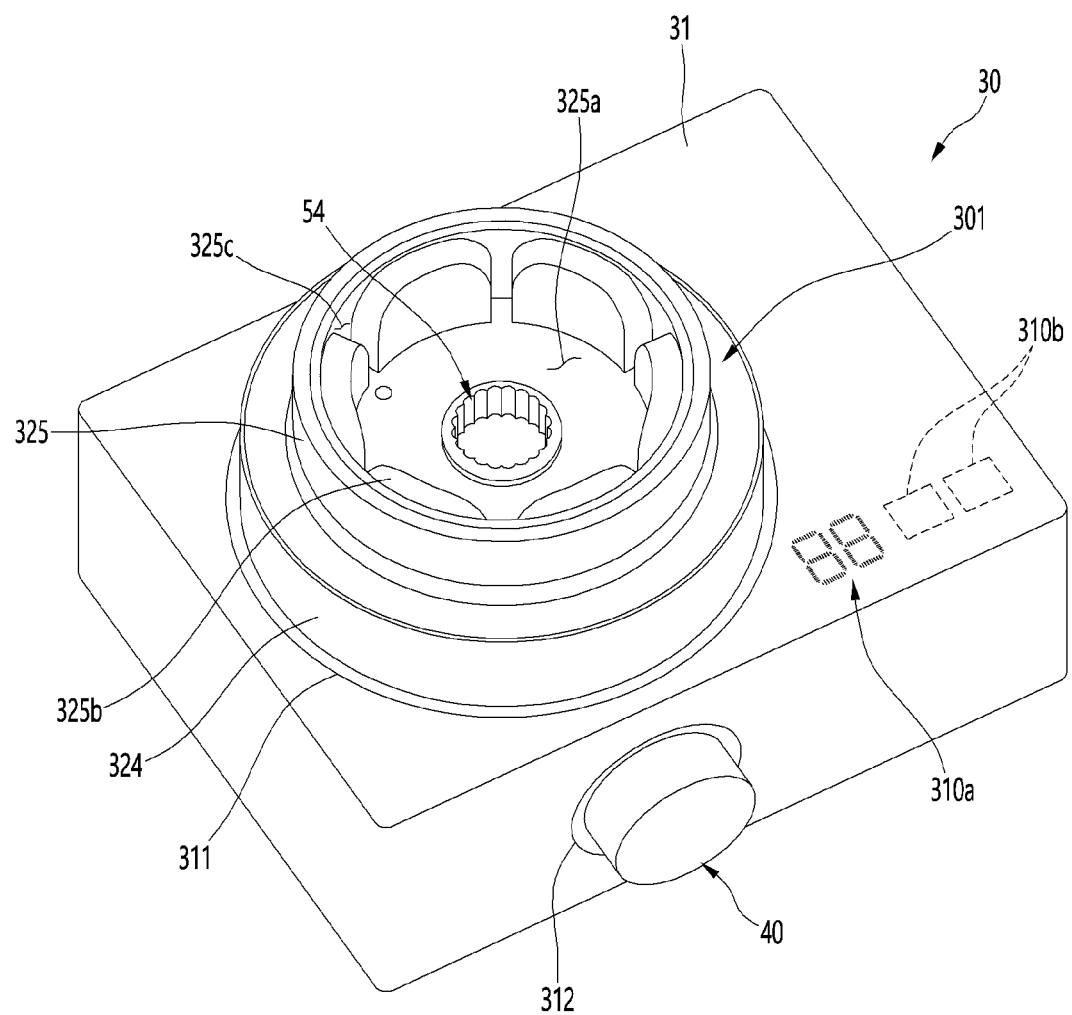
FIG. 4 is a perspective view illustrating a main body that is one component of the blender.

FIG. 1 is a front view illustrating a blender according to an embodiment of the present disclosure, FIG. 2 is a perspective view illustrating the blender, FIG. 3 is a longitudinal cross-sectional view illustrating the blender, and FIG. 4 is a perspective view illustrating a main body that is one component of the blender.

For the convenience of explanation and understanding, the direction is first defined. The position at which a knob 40 is formed is defined as a front surface or a front side, and the portion to which a rear plate (34 in FIG. 3) is disposed is defined as a rear surface or a rear side. In addition, the position of the bottom of a main body 30 may be referred to as a lower surface or lower side, and the position of the upper end of the container 10 may be referred to as an upper surface or an upper side. In addition, the left side based on the knob 40 may be referred to as a left surface or a left side, and the right side based on the knob 40 may be defined as a right side or a right side.

As illustrated, the blender 1 according to an embodiment of the present disclosure may include the main body 30 disposed on the bottom surface, and a container 10 seated on the upper portion of the main body 30.

The main body 30 may be provided with electrical devices and components, including a motor assembly 50 and a printed circuit board (PCB) device 60 for the operation of the blender 1. In addition, manipulating portions 40 and 310b for manipulating the operation of the blender 1 and a display portion 310a for displaying operation thereof may be provided.

The main body 30 may be formed in a hexahedral shape as a whole, and a container seating portion 301 for seating the container 10 may be formed on an upper surface of the main body 30. The container seating portion 301 may be configured to detach the container 10 in the vertical direction.

The outer appearance of the main body 30 may be formed by an outer case 31, and the outer case 31 may be formed in a hexahedral shape with a bottom surface open. In addition, an inner case 32 may be formed inside the outer case 31, and space in which the motor assembly 50, the PCB device 60, and the like are mounted may be provided inside the inner case 32.

The internal and overall structure of the main body 30 is formed by the inner case 32, and the outer case 31 may be mounted on the outside of the inner case 32 to form the outer appearance of the main body 30. The inner case 32 may be injected with a plastic material to provide a structure in which internal and external configurations of the main body 30 can be mounted. In addition, the outer case 31 may be made of a metal material such as stainless steel, and a plate-like material may be bent and bonded to provide a very clean and robust outer appearance shape.

A knob 40 for a user to set the manipulation of the blender 1 may be provided on the front surface of the main body 30. The knob 40 protrudes from the front surface of the main body 30 and can be operated to set the operation of the blender 1 by a rotational manipulation.

A bottom cover 44 may be provided on the lower surface of the main body 30. The bottom cover 44 may be coupled with the outer case 31 and the inner case 32 and may be formed to be in contact with the bottom surface on which the blender 1 is placed. In addition, the bottom cover 44 allows the outer case 31 and the inner case 32 to be spaced apart from the bottom surface, and a cover suction port 444 and a cover discharge port 446 through which cooling air is suctioned and discharged into and out of the main body 30 can be formed.

A display portion 310a for visualizing an operation state of the blender 1 may be provided on the upper surface of the main body 30. For example, the display portion 310a may have a shape such as at least one seven-segment display. In addition, a touch manipulating portion 310b capable of manipulating the start or stop of the blender 1 operation may be provided on an upper surface of the main body 30. For manipulation of the blender 1, the manipulating portions 40 and 310b may include at least one of the knob 40 and the touch manipulating portion 310b.

In addition, a seating portion 301 may be formed on the upper surface of the main body 30. In detail, an upper surface opening 311 may be formed on the upper surface of the outer case 31. The upper surface opening 311 may be formed to have a diameter equal to or slightly larger than the outer diameter of the container seating portion 301. Accordingly, when the inner case 32 and the outer case 31 are coupled, an upper portion of the inner case 32 forming the container seating portion 301 may penetrate the upper surface opening 311 and be exposed to the outside of the outer case 31.

The container seating portion 301 may protrude from the upper surface of the main body 30, and a portion of the container seating portion 301 may be inserted into the lower surface of the container 10 to stably support the container 10. If the container 10 is seated on the container seating portion 301, the motor assembly 50 and the blade device 14 inside the container 10 are coupled to each other to transmit the rotational force to the blade device 14.

The outer appearance of the container seating portion 301 may also be made of the same material as the outer case 31. The container seating portion 301 may be made of a metal material or a material having a metal texture to have a sense of unity with the outer appearance of the main body.

The container seating portion 301 may be formed with a first seating portion 324 and a second seating portion 325 formed stepwise in the vertical direction. The second seating portion 325 may be formed to have a smaller outer diameter than the first seating portion 324.

The second seating portion 325 may extend upward from the upper surface of the first seating portion 324, and an insertion space 325a in which a container coupling portion 103 (see FIG. 7) may be received may be formed therein. A coupling support portion 325b and a container coupling groove 325c may be formed on the inner circumferential surface of the insertion space 325a.

The coupling support portion 325b may form at least a portion of the inner circumferential surface of the second seating portion 325. In addition, when the container 10 is mounted, the coupling support portion 325b is protruded to support the outer surface of the container coupling portion 103. A plurality of the coupling support portion 325b may be spaced apart, and the guide coupling groove 325c may be formed between neighboring coupling support portions 325b.

Therefore, if the container 10 is mounted on the container seating portion 301, the container coupling portion 103 may be mounted in an aligned state by the guide coupling groove 325c. In addition, the coupling support portion 325b may support the outer surface of the container coupling portion 103 so that the container 10 is maintained in a securely mounting state while being mounted on the container seating portion 301. Therefore, the container 10 does not topple in the mounted state and stable operation thereof may be ensured.

A motor assembly 50 may be mounted inside the main body 30 under the container seating portion 301. The motor assembly 50 is for rotation of the blade device 14 inside the container 10 and the blade device can be rotated at a high speed. In addition, the motor assembly 50 can adjust the rotational speed according to the manipulation of the knob 40.

The upper end of the motor assembly 50 may be connected to the blade device 14 inside the container 10. In addition, a cooling fan 55 may be provided at a lower end of the motor assembly 50, and when the motor assembly 50 is driven, the cooling fan 55 can rotate simultaneously with the blade device 14 to force the flow of cooling air inside the main body 30.

Meanwhile, a plurality of PCB devices 60 may be disposed on the inner wall surface of the inner case 32 forming the inner surface of the main body 30. A plurality of PCB devices 60 may be provided and may be disposed on the circumference of the inner surface of the main body 30, that is, on the front surface and the rear surface, and both left and right surfaces thereof, respectively.

In addition, the opened lower surface of the inner case 32 may be shielded by base plate 41. In addition, an air guide 42 for guiding the discharge of cooling air suctioned by the cooling fan 55 may be provided on the base plate 41.

The predetermined space may be formed between the base plate 41 and the bottom cover 44, and in one embodiment, a wireless power device 43 may be provided between the base plate 41 and the bottom cover 44. The wireless power device 43 is capable of supplying power to the motor assembly 50 in a wireless manner using induced electromotive force.

Meanwhile, the container 10 may be formed in a cylindrical shape corresponding to the outer diameter of the container seating portion 301, and the upper surface of the container is opened to form a food receiving space therein.

The container 10 may be made of glass or a material that can be seen through to the inside. For example, the container 10 may be made of a tritan material that is transparent yet resistant to impact and generates very little scratches.

The container 10 may be provided with the blade device 14 at the center of the inner lower surface. The blade device 14 includes a plurality of blades 141 and may be connected to the motor assembly 50. Therefore, when the motor assembly 50 is driven in a state where the container 10 is seated on the main body 30, the blades 141 may be rotated to crush or cut food inside the container 10.

In addition, a plurality of inner guides 121 for guiding food to be rotated may be formed inside the container 10. The inner guide 121 may extend upward from a lower end of the inner surface of the container 10 to a predetermined length and may extend to a lower surface of the lid 20 when the lid 20 is mounted.

Meanwhile, a spout 111 that can pour the crushed food may protrude from the upper end of the container 10, and a handle 13 may protrude from one side facing the spout 111. The handle 13 protrudes outward from the upper end of the container 10 and then extends downward to allow the user to lift or move the container 10. The protruding end portion of the handle 13 may be located on the same extension line as the side end of the main body 30.

In addition, the lid 20 may be mounted on the opened upper surface of the container 10. The lid 20 may shield the opened upper surface of the container 10, and the user holds the auxiliary lid 21 in the center thereof and separates the lid 20 from the container 10 to open and close the opened upper surface of the container 10.

The lid 20 may include a main lid 27 that shields the upper surface of the container 10 and an auxiliary lid 21 in the center of the main lid 27. In addition, a lid gasket 24 may be provided along the circumference of the lid 20.

Hereinafter, a structure of the container 10 will be described in more detail, with reference to the drawings.

Figure 5:
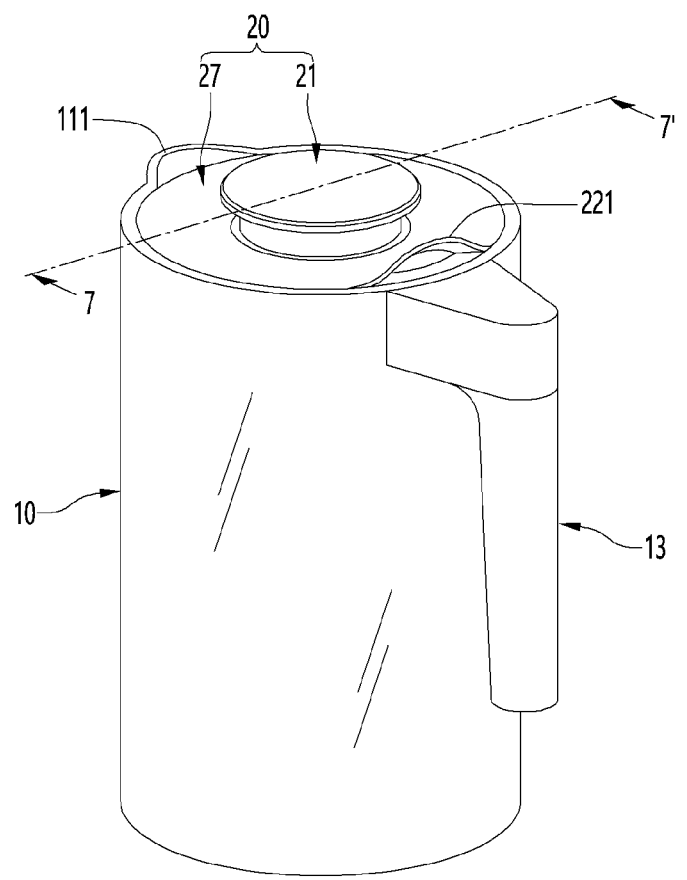
FIG. 5 is a perspective view illustrating a container that is one component of the blender.
Figure 6:
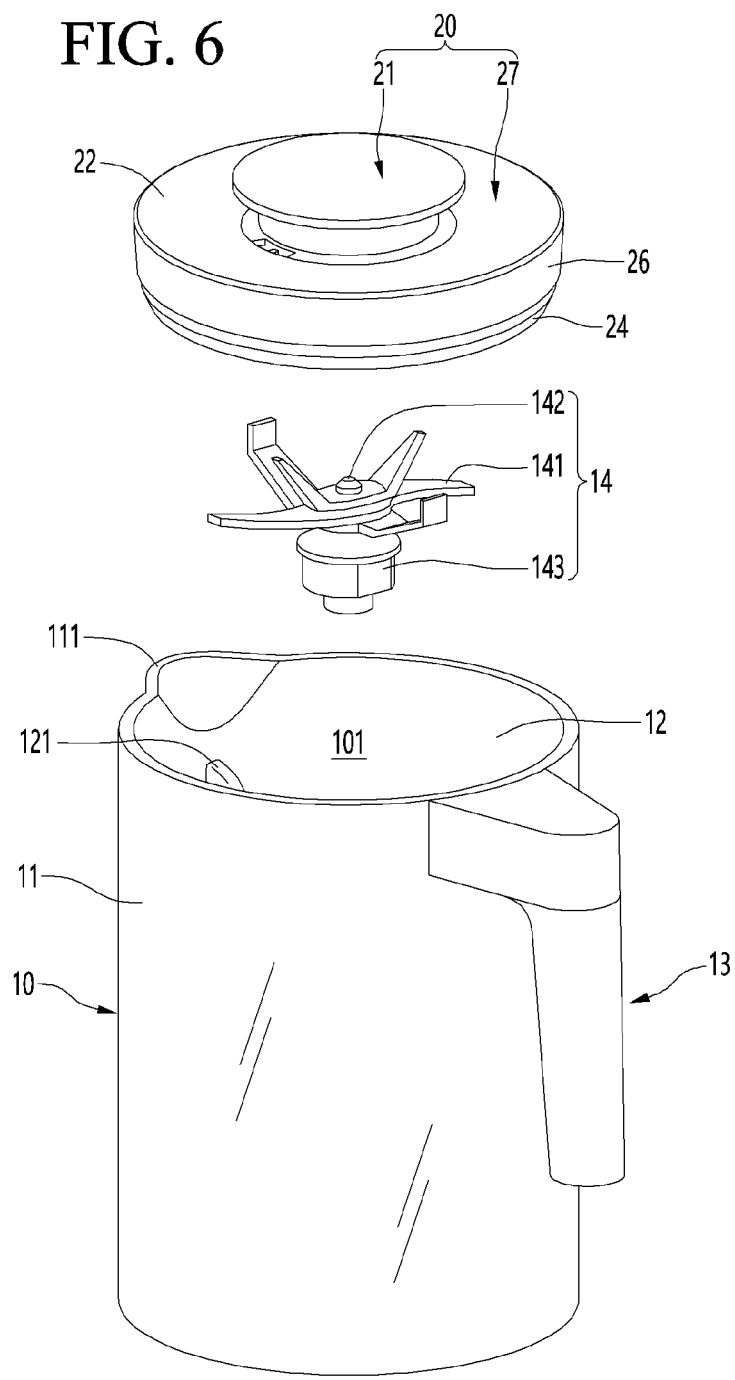
FIG. 6 is an exploded perspective view illustrating the container.
Figure 7:
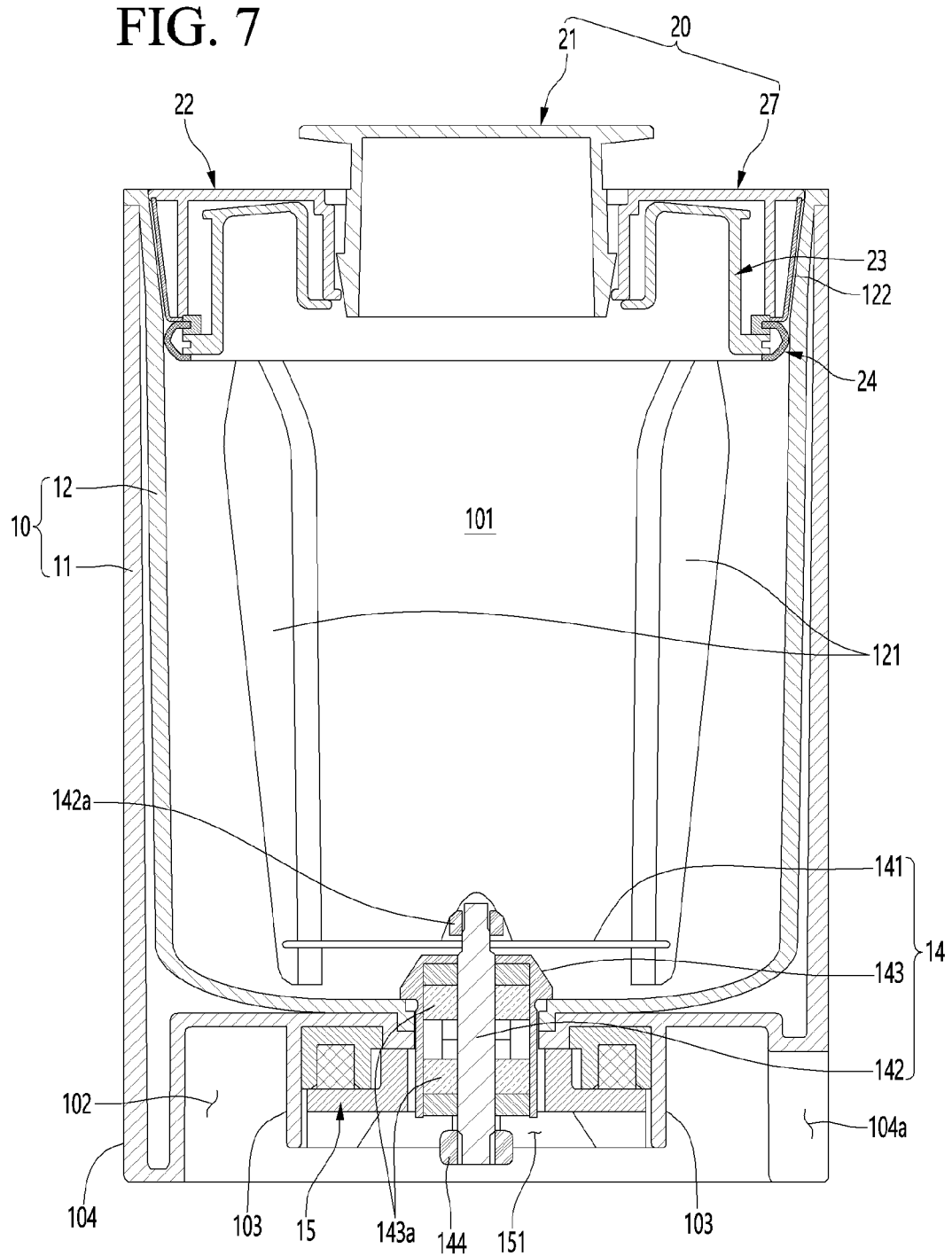
FIG. 7 is a cross-sectional view taken along line 7-7' of FIG. 5.

FIG. 5 is a perspective view illustrating a container that is one component of the blender, FIG. 6 is an exploded perspective view illustrating the container, and FIG. 7 is a cross-sectional view taken along line 7-7' of FIG. 5.

As illustrated in the drawing, the container 10 is formed in a cylindrical shape with an opened upper surface. In addition, a blade device 14 is mounted on the lower surface of the container 10, and the lid 20 may be detachably mounted on the opened upper surface of the container 10.

The container 10 may be made of a material such as glass, tritan, or transparent plastic to check a state of the food inside the container during the operation of the blender 1. In addition, the container 10 may include an outer container 11 forming an outer shape and an inner container 12 forming an inner space in which food is received.

The inner container 12 and the outer container 11 are coupled with each other to form the overall shape of the container 10, and the container 10 may have a double-wall structure. In another embodiment, the container 10 may have a single-wall structure.

In detail, the inner container 12 may be spaced apart from the outer container 11 to form a space between the outer container 11 and the inner container 12. The inner container 12 may have a smaller diameter as it goes downward. The lower portion of the inner container 12 is formed to be inclined or rounded towards the blade device 14 so that the food in the container 10 is directed to the blade device 14.

Meanwhile, the upper end of the inner container 12 may be formed to have an inclined surface 122 whose inner diameter becomes narrower as it goes downward. Therefore, in the process of inserting the lid 20 into the opened upper surface of the container 10, a structure which is sealed may be formed while the inclined surface 122 and the inner container 12 gradually come in close contact with each other. The inclined surface of the upper end of the inner container 12 may be formed from the upper end of the container 10 to the upper end of the inner guide 121 and may be formed along the inner surface circumference of the container 10. In addition, the inner guide 121 may be formed on the inner surface of the inner container 12. The inner guide 121 may extend from the inclined surface 122 to the bottom surface of the inner container 12.

In addition, the outer container 11 may be formed so that outer diameters of the upper end and the lower end thereof have the same cylindrical shapes, and thus the outer appearance of the container 10 can be seen to be neat. In addition, the outer diameter of the outer container 11 may be formed to be the same as the outer diameter of the container seating portion 301, so that the main body 30 and the container 10 may have a sense of unity in a state where the container 10 is mounted.

In addition, the lower surface of the outer container 11 may be formed with a main body receiving portion 102. The main body receiving portion 102 forms a space recessed upward from the lower surface of the outer container 11 and forms space into which the second seating portion 325 described above may be inserted. By the coupling of the main body receiving portion 102 and the second seating portion 325, the container 10 may maintain a state of being mounted on the container seating portion 301.

A container coupling portion 103 on which the blade device 14 is mounted may be formed at the center of the lower surface of the outer container 11. The container coupling portions 103 may be located on the inner surface of the outer container 11 and the inner center of the body receiving portion 102. The container coupling portion 103 may be formed to protrude downward in a rib shape extending downward about the center of the bottom surface of the container 10. In addition, the container coupling portion 103 does not extend further downward than the lower end of the outer container 11 and provides a space in which the blade device 14 is disposed in the center of the container 10. In addition, the inside of the container coupling portion 103 may have a structure that is fitted to the inside of the container seating portion 301 when the container is seated on the container seating portion 301.

In addition, a lower end support portion 104 may be formed around the lower surface of the container 10. The lower end support portion 104 may be spaced apart from the circumference of the container coupling portion 103, and the main body receiving portion 102 may be formed between the lower end support portion 104 and the container coupling portion 103. The main body receiving portion 102 forms a space into which an upper end of the container seating portion 301 may be inserted.

The lower end support portion 104 may be formed by extending the outer container 11 downward and forms a circumference of the lower end of the container 10. In addition, the lower end support portion 104 may be formed by a shape in which the outer container 11 is bent inward.

The lower end of the lower end support portion 104 may be formed to have a predetermined thickness and may be supported by the stepped container seating portion 301. In addition, the outer surface of the lower end support portion 104 may be located on the same plane as the outer surface of the container seating portion 301, and in a state where the container 10 is mounted on the container seating portion 301, the container 10 and the main body 30 may have a sense of unity.

The lower end support portion 104 may extend further downward than the lower end of the container coupling portion 103. Therefore, it is possible to prevent the container coupling portion 103 from interfering with the container seating portion 301 before the container 10 is completely mounted on the main body 30. In addition, when the container 10 is placed on the bottom surface in a separated state, the container coupling portion 103 may be spaced apart from the bottom surface, and the lower end support portion 104 contacts with the bottom surface, so that the container 10 may maintain a state of being stably supported.

Meanwhile, an air vent 104a may be formed on the lower end support portion 104. The air vent 104a forms a passage through which air between the lower surface of the container 10 and the upper surface of the container seating part 301 enters and exits when the container 10 and the seating portion 301 are coupled to each other or separated from each other so that the container 10 can be easily mounted on and separated from the container seating portion 301.

Meanwhile, the lower surface of the container 10 may be provided with the blade device 14 in the center thereof. The blade device 14 is for crushing the food received in the inner space 101 of the container 10 and may include a plurality of blades 141, a blade shaft 142, and a shaft mounting member 143.

The plurality of blades 141 may be extended in different directions from each other, the plurality of blades may be configured in combination, and the plurality of blades 141 may be radially disposed about the blade shaft 142. The blade 141 may be formed to be symmetrical about the blade shaft 142, and extension directions, bending angles, and shapes of the plurality of blades 141 may be formed differently, respectively. In other words, the blades 141 of various shapes may be combined to be suitable for both grinding and cutting various foods and making foods into a powder or a liquid.

The blade shaft 142 is mounted to penetrate the shaft mounting member 143 and may be supported by a bearing 143a constituting the shaft mounting member 143. A plurality of bearings 143a may be disposed in the vertical direction and may support so that the blade shaft 142 can be stably rotated. In addition, the shaft mounting member 143 may be securely fixed through the bottom surface of the container 10.

A blade constraining member 142a for preventing the separation of the blade 141 and maintaining a state where the blade 141 is fixed to the blade shaft 142 may be fastened to the upper end of the blade shaft 142.

In addition, a blade-side connecting portion 144 may be formed on the lower end of the blade shaft 142. The blade-side connecting portion 144 may be exposed at the center of the bottom surface of the container 10 and may protrude downward. Therefore, when the container 10 is mounted on the container seating portion 301, the blade-side connecting portion 144 is connected to the motor-side connecting portion 54 so that the power of the motor assembly 50 may be transmitted.

Meanwhile, the container coupling portion 103 may be formed on the bottom surface of the container 10, and a mounting cover 15 may be provided inside the container coupling portion 103. The mounting cover 15 forms a receiving space 151 in which the motor-side connecting portion 54 may be received when the container 10 is mounted on the container seating portion 301.

In other words, the center of the mounting cover 15 may be opened to be penetrated by the shaft mounting member 143, and the blade-side connecting portion 144 may be exposed through the center of the lower surface of the mounting cover 15. In addition, the central portion of the mounting cover 15 corresponding to the circumference of the blade-side connecting portion 144 is recessed, and thus is formed so that the motor-side connecting portion 54 is received.

Therefore, in the process in which the container 10 is seated on the container seating portion 301, the motor-side connecting portion 54 and the blade-side connecting portion 144 do not interfere with each other and have a structure that can be naturally coupled to each other.

Meanwhile, the lid may open and close the opened upper surface of the container and, in the mounted state, may be in close contact with the circumferential surface of the container.

The lid 20 may include a main lid 27 for shielding the opened upper surface of the container 10 and an auxiliary lid 21 mounted to penetrate the center of the main lid 27. In addition, a lid gasket 24 may be provided around the lid 20 to be in contact with the inner surface of the container 10 to seal the inside of the container 10. Therefore, the lid 20 can be inserted through the opened upper surface of the container 10, and the lid gasket 24 is in contact with the inclined surface 122 of the container to maintain airtightness while the lid 20 is mounted. In addition, the lid gasket 24 may be pressed against and be in close contact with the inner surface of the container 10 to prevent the lid 20 from being unintentionally separated from the container.

Hereinafter, the structure of the lid 20 will be described in more detail, with reference to the drawings.

Figure 8:
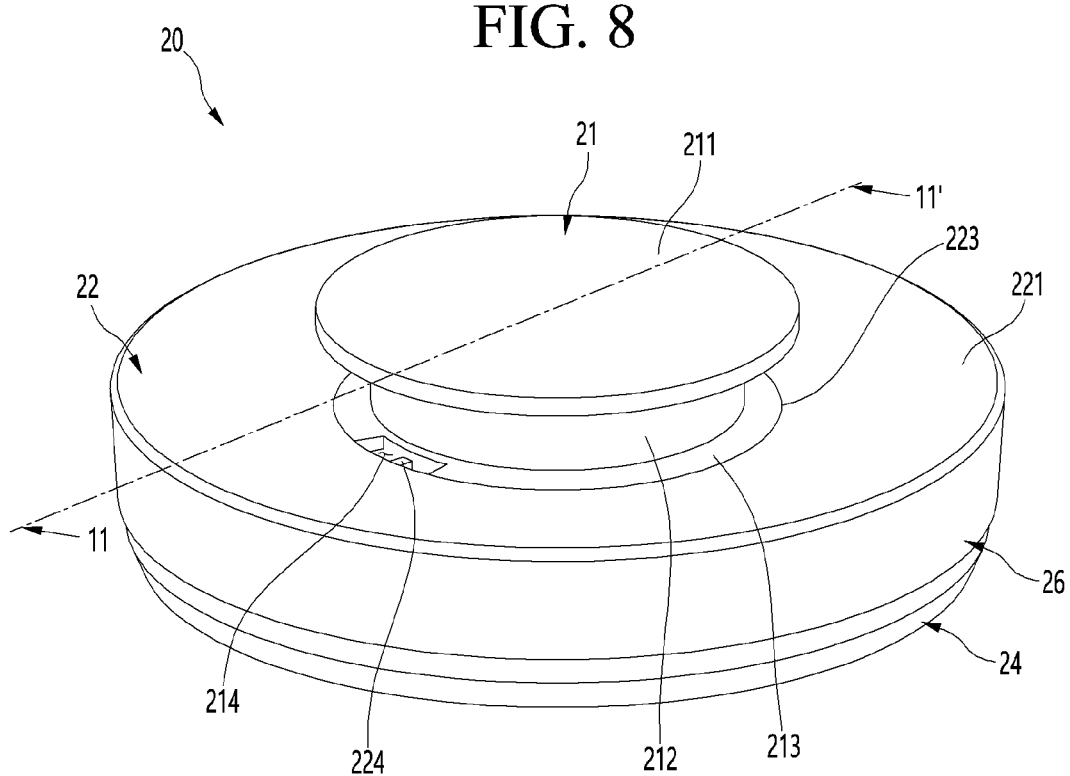
FIG. 8 is a perspective view illustrating a lid according to an embodiment of the present disclosure.
Figure 9:
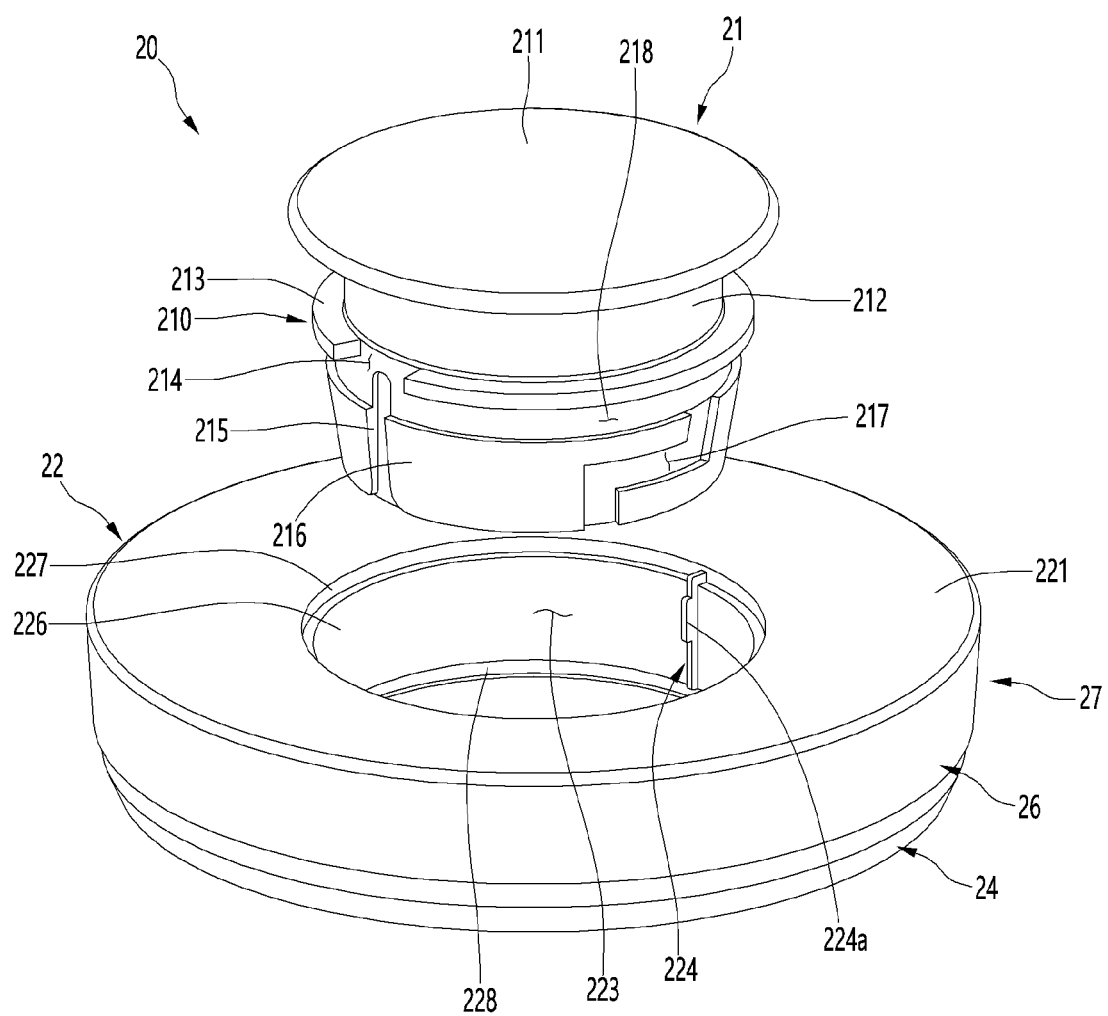
FIG. 9 is an exploded perspective view illustrating a state where the main lid and the auxiliary lid that are components of the lid are separated.
Figure 10:
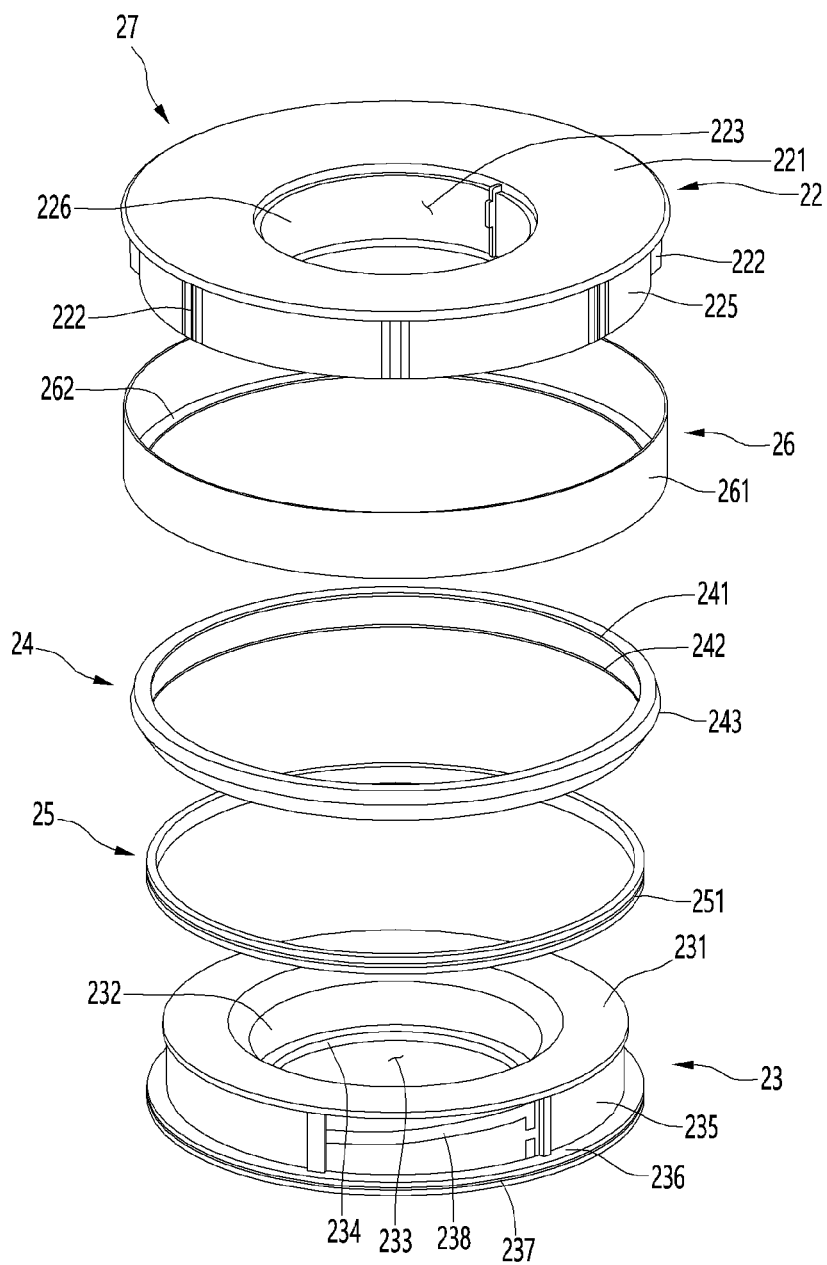
FIG. 10 is an exploded perspective view illustrating the main lid.
Figure 11:
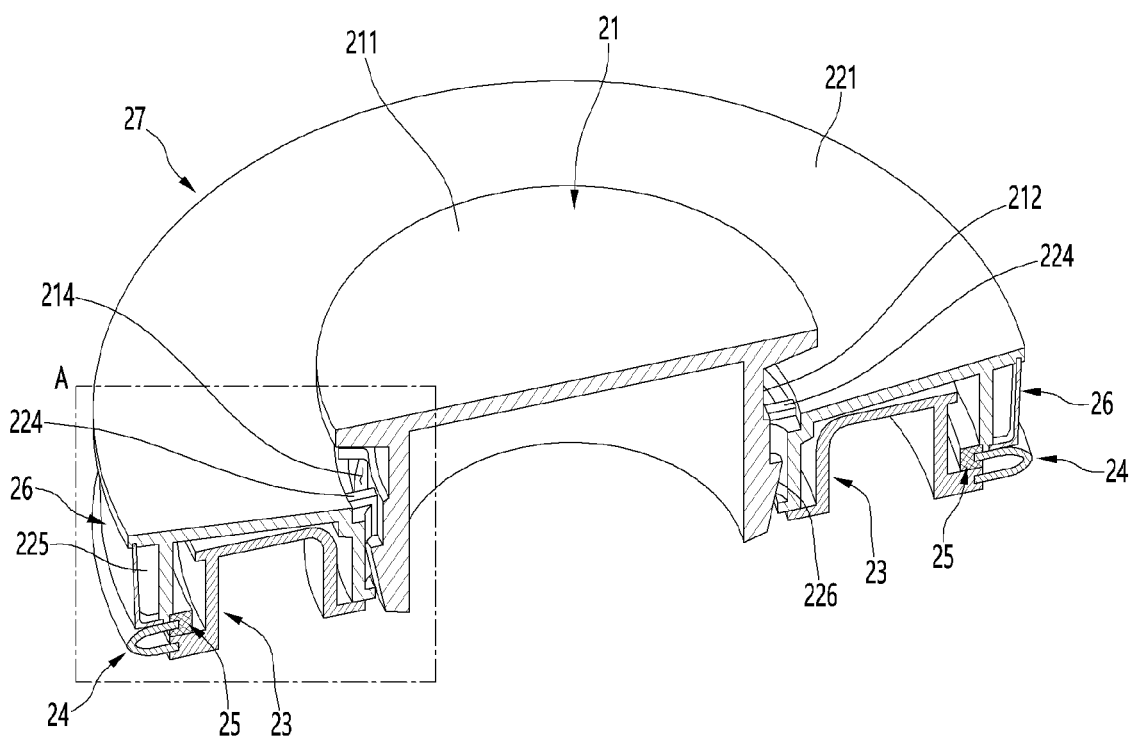
FIG. 11 is a cutaway perspective view taken along line 11-11' of FIG. 8.
Figure 12:
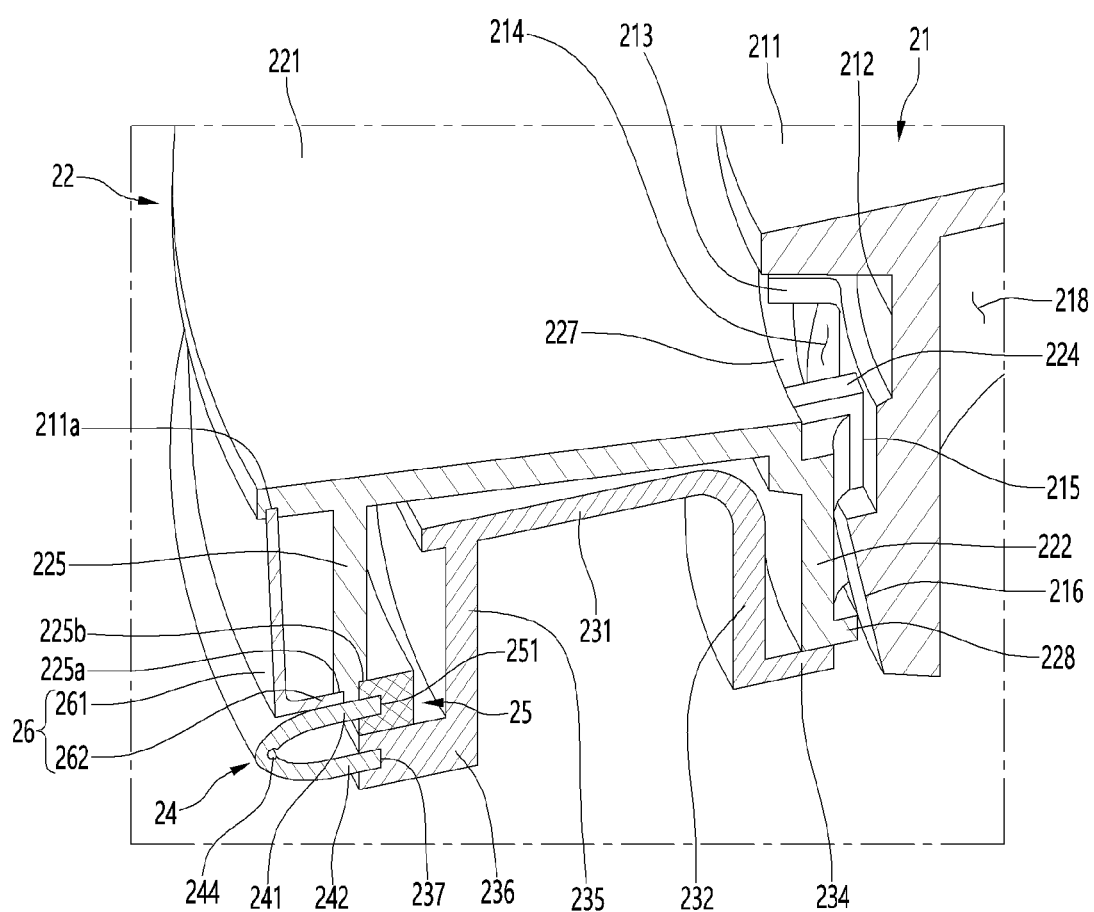
FIG. 12 is an enlarged view illustrating part A of FIG. 11.

FIG. 8 is a perspective view illustrating a lid according to an embodiment of the present disclosure, FIG. 9 is an exploded perspective view illustrating a state where the main lid and the auxiliary lid that are components of the lid are separated, FIG. 10 is an exploded perspective view illustrating the main lid, FIG. 11 is a cutaway perspective view taken along line 11-11' of FIG. 8, and FIG. 12 is an enlarged view illustrating part A of FIG. 11.

The lid 20 may be inserted inside the opened upper surface of the container 10 as a whole and may shield the opened upper surface of the container 10. In addition, in a state where the lid 20 is inserted, the upper end of the main lid 27 and the upper surface of the container 10 may be configured to be in the same plane.

The lid 20 may include a main lid 27 and an auxiliary lid 21. The main lid 27 may substantially open and close the opened upper surface of the container 10. In addition, the auxiliary lid 21 may be called a cap or a stopper to open and close the through-hole 223 penetrating the main lid 27. In addition, the auxiliary lid 21 may be called a handle because it is the part held and rotated by a user during a manipulation for rotating the upper body 22. In a state where the upper surface of the container 10 is shielded by the main lid 27, the user may separate the auxiliary lid 21 which shields the through-hole 223 and can access the inside of the container 10.

The main lid 27 may be formed in a disc shape having an outer diameter corresponding to the inner diameter of the opened upper surface of the container 10. In addition, the main lid 27 is formed to have a predetermined thickness in the vertical direction to be in close contact with the inner surface of the container 10.

In addition, a through-hole 223 may be formed in the center of the main lid 27. The through-hole 223 may be formed in a shape that penetrates the main lid 27 in the vertical direction to connect the upper and lower surfaces of the main lid 27.

The auxiliary lid 21 may protrude upward in a state of being mounted in the through-hole 223 in the center of the main lid 27, and, in a state where the user holds the auxiliary lid 21, the manipulation of main lid 27 to open and close the opened upper surface of the container 10 may be performed.

The main lid 27 may include an upper body 22 forming an upper outer appearance and a lower body 23 provided below the upper body 22 to form a lower outer appearance of the lid 20. In addition, the main lid 27 may include a deco plate 26 that forms a circumferential outer appearance of the lid 20, and a gasket 24 that seals between the lid 20 and the container 10.

In detail, the upper body 22 may include a top plate 221 which forms an outer appearance of an upper surface, and in which the through-hole 223 is opened in the center thereof, an upper inner part 226 extending downward along the inner circumference of the top plate 221, and an upper outer part 225 extending downward along an outer circumference of the top plate 221.

The top plate 221 may form an upper surface of the main lid 27 and form most of the outer appearance exposed to the outside of the lid 20. In addition, the upper inner part 226 may extend vertically downward from the inner circumference of the top plate 221. The upper end of the upper inner part 226, that is, the upper end of the through-hole 223 may be formed stepwise, and a through-hole seating portion 227 may be formed so that a lid rib 213 to be described below may be seated.

In addition, a rotation protrusion 224 protruding inward into the through-hole 223 may be formed on the inner surface of the upper inner part 226. The rotation protrusion 224 extends longitudinally in the vertical direction and may extend from the upper end to the lower end of the upper inner part 226. The rotation protrusion 224 may be formed in a form that can be inserted into a rotation groove 215 of the auxiliary lid 21 to be described below.

In addition, the rotation protrusion 224 may be further formed with a lid constraining portion 224a further protruding inward into the through-hole 223. The lid constraining portion 224a is formed to be locked and constrained inside the rotation groove 215, so that when the auxiliary lid 21 is lifted upward, the main lid 27 may be lifted together by maintaining a state where the lid constraining portion 224a is a constrained inside the rotation groove 215. Of course, if the auxiliary lid 21 is lifted with a force equal to a predetermined force or more, the rotation protrusion 224 may separate from the rotation groove 215 so that the main lid 27 and the auxiliary lid 21 is separated.

A plurality of rotation protrusions 224 may be formed and may be disposed at positions facing each other. In addition, the rotation protrusion 224 may be positioned at a position corresponding to the rotation groove 215, and when the auxiliary lid 21 is mounted to the through-hole 223, the rotation protrusion 224 may be inserted into the inside of the rotation groove 215.

In addition, the upper inner part 226 may extend to a lower end of the lower body 23. An inner lower end portion 228 protruding inward towards the through-hole 223 may be formed at a lower end of the upper inner part 226. The inner lower end portion 228 may extend in an inner direction and may be in contact with an inclined surface of an airtight portion 216 formed around the lower portion of the auxiliary lid 21. Therefore, it is possible to prevent the food inside the container 10 from escaping to the outside during the operation of the blade device 14 by allowing the auxiliary lid 21 and the main lid 27 to be in close contact with each other.

The upper outer part 225 is formed at a position slightly spaced inward from the outer end of the top plate 221 and may extend downward along the circumference of the top plate 221. In addition, the upper outer part 225 may extend in a direction perpendicular to the top plate 221 and may extend to a position spaced apart from the lower body 23.

When the upper body 22 is rotated, a lifting and lowering protrusion (229 in FIG. 13) that moves along a lifting and lowering guide 238 to be described in detail below may protrude from the inside of the upper outer part 225.

The lifting and lowering protrusion 229 may be formed to protrude inward from an inner surface of the upper outer part 225 corresponding to the lifting and lowering guide 238. As an example, a pair of lifting and lowering protrusions 229 may be provided on the inner surface of the upper outer part 225 and may protrude in directions facing each other. In addition, a pair of lifting and lowering guides 238 may be formed on the outer surface of the lower body 23 each facing the respective lifting and lowering protrusion 229 to guide the movement of the lifting and lowering protrusion 229.

The lifting and lowering protrusion 229 may extend longitudinally from an inner upper end to a lower end of the upper outer part 225. In addition, the lifting and lowering protrusion 229 may protrude vertically from the lower end to be in contact with the lifting and lowering guide 238 from the inner surface of the upper outer part 225.

The more protruding contact portion 229a may be formed at the lower end of the lifting and lowering protrusion 229. The contact portion 229a may protrude inward from the lower end of the lifting and lowering projection 229, that is, the lower end of the upper outer part 225 and may protrude to be in contact with the lower surface of the lifting and lowering guide 238. Therefore, when the upper body 22 is rotated, the upper surface of the contact portion 229a may move along the lower surface of the lifting and lowering guide 238.

The pair of lifting and lowering guides 238 may be provided to correspond to the pair of lifting and lowering protrusions 229 and may be formed at positions facing the respective lifting and lowering protrusions 229. Of course, the number of the lifting and lowering guides 238 and the lifting and lowering protrusions 229 is not limited, but a plurality of lifting and lowering guides and a plurality of lifting and lowering protrusions are preferably provided for stable rotation of the upper body 22 and the relative lifting and lowering motion with the lower body 23. It would be desirable to have a pair of lifting and lowering guides and a pair of lifting and lowering protrusions on both sides facing each other.

A number of support ribs 222 may be formed around the upper outer part 225. The support rib 226 extends from the upper end to the lower end of the upper outer part 225, and a plurality of upper ribs 222 may be formed on the outer surface of the upper outer part 225 at regular intervals. The support rib 226 is for supporting the deco plate 26 mounted on the upper outer part 225 from the inside and supports so that the deco plate 26 made of a metal plate does not get deformed.

The support rib 226 may protrude less than the outer circumferential surface of the top plate 221. Then, the deco plate 26 may be formed to have a size corresponding to the upper outer part 225. Therefore, the deco plate 26 may form a circumferential surface of the upper body 22 while seated on the support rib 222.

The deco plate 26 may be made of a metal material, and, for example, may be formed of a plate-shaped stainless material. The deco plate 26 may be composed of a side surface portion 261 forming a side surface of the upper body 22 and a lower surface portion 262 that is bent inward from a lower end of the side surface portion 261 to be in contact with the gasket 24. In addition, an upper end of the side surface portion 261 may be fixed to an upper plate groove 211a formed on the lower surface of the outer end of the top plate 221. In addition, an outer end of the lower surface portion 262 may be fixed to a lower plate groove 225a formed at the lower end of the upper outer part 225. In other words, the deco plate 26 is fixedly mounted around the upper body 22 and forms the upper body 22, that is, the outer appearance of the circumferential surface of the main lid 27.

Meanwhile, a gasket fixing member 25 may be provided at a lower end of the upper body 22. The gasket fixing member 25 may be provided at the lower end of the upper body 22, that is, the lower end of the upper outer part 225, and an upper end of the gasket 24 may be fixed thereto.

In detail, the gasket fixing member 25 may be disposed along the lower end of the upper outer part 225 and may be mounted to support a fixing member mounting portion 225b formed stepwise at the lower end of the upper outer part 225. At this time, the fixing member mounting portion 225b may hold the gasket fixing member 25 to the upper outer part 225 which is in a state capable of being rotated. In other words, the gasket fixing member 25 in a state where the gasket 24 is mounted supports the upper body 22 from below, and the upper body 22 may be supported in a rotatable state. Therefore, when the upper body 22 is rotated, the gasket fixing member 25 maintains the position as it is and only the upper body 22 may be rotated.

The gasket 24 is disposed at the lower end of the circumference of the lid 20 and may be made of a material having elasticity. In the gasket 24, the central portion 243 may protrude outward, and the protruding central portion 243 is in contact with the inner surface of the container 10 to seal between the container 10 and the lid 20.

The gasket 24 may be composed of a gasket upper portion 241 and a gasket lower portion 242 based on the center thereof. End portions of the gasket upper portion 241 and the gasket lower portion 242 may extend inward, respectively.

The extended end portion of the gasket upper portion 241 may be fixed by being inserted into the upper fixing groove 251 of the gasket fixing member 25. In addition, the extended end portion of the gasket lower portion 242 may be fixed by being inserted into the lower fixing groove 237 formed at the lower end of the lower body 23. Therefore, as the upper body 22 or the lower body 23 moves in the vertical direction, the gasket upper portion 241 and the gasket lower portion 242 are brought closer to or farther from each other, and the central portion of the gasket 24 may optionally protrude to the outside. For example, as illustrated in FIG. 12, when the lower body 23 is positioned at the uppermost position, the protruding central portion 243 of the gasket 24 protrudes most outward, and in this case, the inner surface of the container 10 and the gasket 24 are completely in close contact with each other to maintain airtightness and prevent the lid 20 from being disassembled from the container 10. On the other hand, when the upper body 22 is rotated in the state of FIG. 12 and the lower body 23 moves downward relatively, the central portion 243 of the gasket 24 is relatively protruding less, and in this case, the inner surface of the container 10 and the gasket 24 may be separated from each other or the contact is loose, and the lid 20 may be easily separated from the container 10.

Meanwhile, a gasket groove 244 may be formed on an inner surface corresponding to the central portion 243 of the gasket 24. The gasket groove 244 may be recessed at a point where the gasket upper portion 241 and the gasket lower portion 242 meet each other. In addition, the gasket groove 244 is formed along a space between the gasket upper portion 241 and the gasket lower portion 242 so that the gasket 24 may be more easily compressed in the vertical direction and the center portion 243 thereof may protrude outward.

The lower body 23 is provided below the upper body 22 and may be formed in a circular shape with a center opening corresponding to the through-hole 223. In addition, the lower body 23 may be formed in a structure in which at least a portion is received in the recessed inner space of the upper body 22.

In detail, the lower body 23 may include a lower plate 231 forming an upper surface of the lower body 23, a lower inner part 232 extending downward from an inner end of the lower plate 231, and a lower outer part 235 extending downward from the outer end of the lower plate 231.

The lower plate 231, the lower inner part 232, and the lower outer part 235 may be received inside a space formed by the top plate 221, the upper inner part 226, and the upper outer part 225 of the upper body 22. In addition, the upper body 22 and the lower body 23 may be disposed to rotate relative to each other.

The lower plate 231 may be disposed in parallel with the top plate 221. In addition, the lower inner part 232 and the lower outer part 235 may be formed to extend further downward than the upper inner part 226 and the upper outer part 225.

The lower inner part 232 may extend downward along the inner end of the lower plate 231 and may extend parallel to the upper inner part 226. In addition, an inner support portion 234 extending inward towards the through-hole 223 may be formed at a lower end of the lower inner part 232. The inner support portion 234 is vertically bent from the lower end of the lower inner part 232 to allow the inner lower end portion 228 of the upper inner part 226 to be seated on its upper surface. In other words, the inner lower end portion 228 is seated on the inner support portion 234 at a position where the upper body 22 is lowest with respect to the lower body 23, thereby supporting the upper body 22 so that the upper body 22 can no longer move downward.

The lower outer part 235 may extend downward along the outer end of the lower plate 231. The lower outer part 235 is disposed parallel to the upper outer part 225 and may extend further downward than the upper outer part 225. In addition, an outer support portion 236 may be formed at an extended end portion of the lower outer part 235.

The outer support portion 236 is vertically bent outward from the lower end of the lower outer part 235 and extends outwardly to support the lower surface of the gasket fixing member 25. In other words, the protruding end portion of the outer support portion 236 may be located at a position corresponding to the outer end of the gasket fixing member 25. In addition, a lower fixing groove 237 into which the gasket lower portion 242 is inserted and to which the gasket lower portion 242 is fixed may be formed at the protruding end portion of the outer support portion 236.

As illustrated in FIG. 12, when the upper body 22 and the lower body 23 is closest, that is, when the upper body 22 is in the lowest position with respect to the lower body 23, the inner support portion 234 may support the inner lower end portion 228 from below, and the outer support portion 236 may support the gasket fixing member 25 from below.

Meanwhile, the structure of the lifting and lowering guide 238 for adjusting the distance between the upper body 22 and the lower body 23 will be described in more detail with reference to the drawings.

Figure 13:
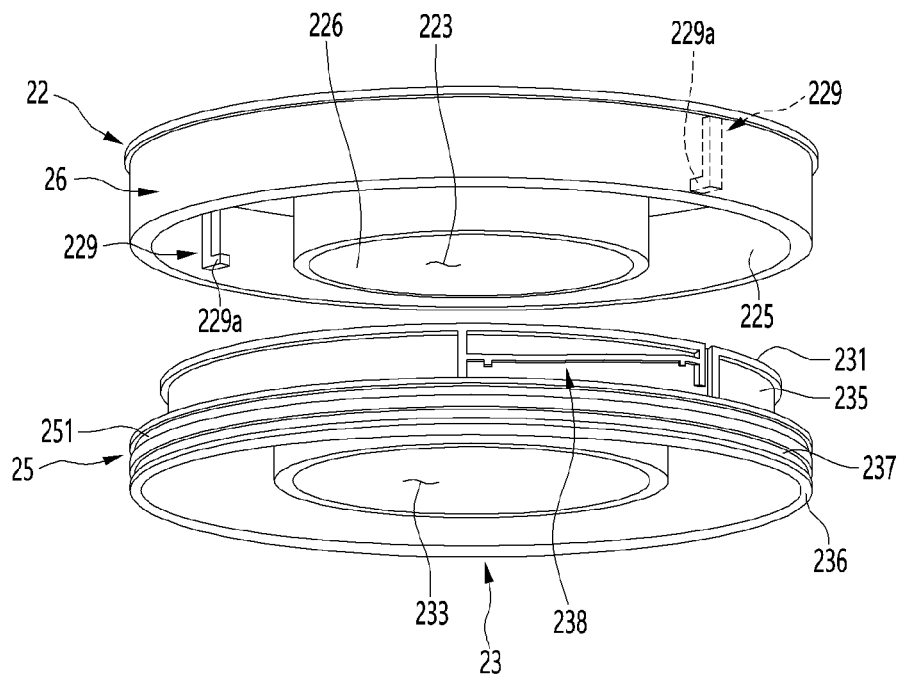
FIG. 13 is an exploded perspective view illustrating a state where the upper body and the lower body that are components of the main lid are separated.
Figure 14:
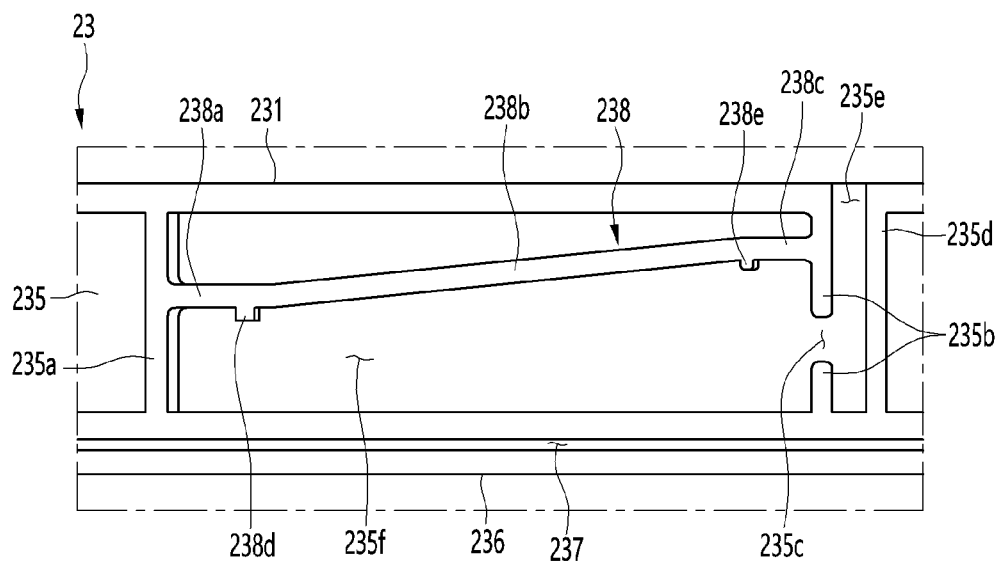
FIG. 14 is a partially enlarged view illustrating a lifting and lowering guide of the lower body.

FIG. 13 is an exploded perspective view illustrating a state where the upper body and the lower body that are components of the main lid are separated, and FIG. 14 is a partially enlarged view illustrating a lifting and lowering guide of the lower body.

As illustrated in FIGS. 13 and 14, the lifting and lowering guide 238 may be formed on an outer surface of the lower body 23. The lifting and lowering guide 238 may protrude outward from the outer surface of the lower outer part 235. The lifting and lowering guide 238 may be formed at a position corresponding to the position of the lifting and lowering protrusion 229 and may be extended lengthwise along the circumference of the lower outer part 235.

The lifting and lowering guide 238 may be formed to be inclined, and the heights of the extended opposite ends thereof may be formed differently. In other words, the height of the lifting and lowering guide 238 may be formed to gradually increase or decrease as the lifting and lowering guide 238 extends from one end to the other end. In addition, a section in a horizontal state with an upper surface or a lower surface of the main lid 27 without being inclined at the opposite ends of the lifting and lowering guide 238 may be formed.

In detail, the lifting and lowering guide 238 may include a lower horizontal portion 238a, an inclined portion 238b, and a horizontal portion 238c. The inclined portion 238b is to allow the distance between the upper body 22 and the lower body 23 to decrease or increase while being moved in contact with the lifting and lowering protrusions 229 and is formed over most sections of the lifting and lowering guide 238, and at least the lower surface thereof may be formed to be inclined.

Meanwhile, the upper body 22 and the lower body 23 may be supported by the gasket 24. Therefore, by the elastic force of the gasket 24, the upper body 22 tends to maintain a state where the distance between the upper body 22 and the lower body 23 is increased, and thus the lifting and lowering protrusion 229 may maintain a state of being in contact with the lower surface of the lifting and lowering guide 238. In this state, according to the rotation of the upper body 22, the lifting and lowering protrusion 229 may move along the inclined portion 238b, and a distance between the upper body 22 and the lower body 23 may be adjusted and the protruding degree of the gasket 24 can be adjusted accordingly.

The lower horizontal portion 238a may be formed at one lower end of the opposite ends of the lifting and lowering guide 238. The lower horizontal portion 238a may extend horizontally with the upper surface or the lower surface of the main lid 27 from one lower end of the lifting and lowering guide 238. Accordingly, the upper body 22 and the lower body 23 may be a state of being closest to each other in a state where the lifting and lowering protrusion 229 is positioned at the lower horizontal portion 238a, and the gasket 24 may be in the most protruding state.

In addition, a lower constraining portion 238d may be formed at an end portion of the lower horizontal portion 238a. The lower restraining portion 238d may be formed in a protruding shape protruding downward. Therefore, the lifting and lowering protrusion 229 moving downward along the inclined portion 238b by the rotation of the upper body 22 moves towards the lower constraining portion 238d and then comes into contact with the lower constraining portion 238d. At this time, when the upper body 22 is further rotated, the lifting and lowering protrusion 229 may enter the lower horizontal portion 238a beyond the lower constraining portion 238d. Therefore, until sufficient external force is applied to the lifting and lowering protrusion 229, the lifting and lowering protrusion 229 is constrained by the lower constraining portion 238d and does not move to the inclined portion 238b, and the position thereof is maintained on the lower horizontal portion 238a. In other words, the upper body 22 and the lower body 23 can maintain a state of being closest to each other.

A horizontal portion 238c may be formed at one high end of the opposite ends of the lifting and lowering guide 238. The horizontal portion 238c may extend horizontally with the upper surface or the lower surface of the main lid 27 from a high side end of the lifting and lowering guide 238. Accordingly, the upper body 22 and the lower body 23 may be a state of being farthest from each other in a state where the lifting and lowering protrusion 229 is positioned at the higher horizontal portion 238c, and the gasket 24 may be in the least protruding state to the outside.

In addition, an upper constraining portion 238e may be formed at an end portion of the horizontal portion 238c. The upper restraining portion 238e may be formed in a protrusion shape protruding downward. Therefore, the lifting and lowering protrusion 229 moved upward along the inclined portion 238b by the rotation of the upper body 22 moves to the upper constraining portion 238e and then comes into contact with the upper constraining portion 238e. At this time, when the upper body 22 is further rotated, the lifting and lowering protrusion 229 may enter the horizontal portion 238c beyond the upper restraining portion 238e. Therefore, until sufficient external force is applied, the lifting and lowering protrusion 229 is constrained by the upper constraining portion 238e and does not move to the inclined part 238b, and the position thereof may be maintained on the horizontal part 238c. In other words, the upper body 22 and the lower body 23 can maintain a state where the distance between the upper body 22 and the lower body is increased.

Meanwhile, a first side rib 235a and a second side rib 235b may be formed at both side ends of the lifting and lowering guide 238. The first side rib 235a and the second side rib 235b protrude from the outer surface of the lower outer part 235 and may extend from the upper end to the lower end of the lower outer part 235. In addition, the first side rib 235a may be connected to the lower horizontal portion 238a, and the second side rib 235b may be connected to the higher horizontal portion 238c.

A recessed protrusion receiving space 235f may be formed on the outer surface of the lower outer part 235 by the first side rib 235a, the second side rib 235b, and the lifting and lowering guide 238. The lifting and lowering protrusion 229 is movable along the lifting and lowering guide 238 in a state of being received inside the protrusion receiving space 235f.

The second side rib 235b may be formed with a rib opening 235c through which the lifting and lowering protrusion 229 can enter and exit. The rib opening 235c may be opened to be equal to or larger than the width of the contact portion 229a of the lifting and lowering protrusion 229 in the vertical direction to allow the lifting and lowering protrusion 229 to enter and exit while moving in the horizontal direction. At this time, the rib opening 235c is located below an upper portion of the second side rib 235b, and thus the lifting and lowering protrusion 229 located at the horizontal portion 238c can be prevented from being unintentionally dropped into the rib opening 235c.

Meanwhile, a third side rib 235*d* may be provided at a side of the second side rib 235*b*. The third side rib 235*d* forms a passage through which the lifting and lowering protrusion 229 enters and exits when the upper body 22 and the lower body 23 are assembled and may be formed at a position spaced apart by the width equal to or greater than the thickness of the lifting and lowering protrusion 229 from the second side rib 235*b*. A protrusion movement passage 235*e* is formed between the third side rib 235*d* and the second side rib 235*b*, and the protrusion movement passage 235*e* may be opened upward. The lifting and lowering protrusion 229 may be moved in the vertical direction through the protrusion movement passage 235*e*. Therefore, when the upper body 22 and the lower body 23 are assembled, the lifting and lowering protrusion 229 may be inserted into the opened upper side of the protrusion movement passage 235*e*.

Hereinafter, it will be described with respect to the auxiliary lid 21.

The auxiliary lid 21 may include a lid upper surface portion 211 forming an upper surface and a lid body 210 extending downward from the lid upper surface portion 211. The lid body 210 may refer to the entire portion extending downward from the lid upper surface portion 211. In addition, the lid body 210 may be removed or inserted into the through-hole 223 to open and close the through-hole 223.

A lid rib 213 may be formed on the auxiliary lid 21. The lid rib 213 may be formed to protrude outward along the circumference of the lid body 210. The lid rib 213 may be configured such that when the auxiliary lid 21 is inserted into the through-hole 223, the auxiliary lid 21 shields the through-hole 223 in a closed state. The lid rib 213 may be formed in a shape corresponding to the through-hole 223.

In addition, the lid rib 213 may be formed with a vent hole 214. The vent hole 214 may be a passage in which a portion of the lid rib 213 is opened and which communicates with the inside of the through-hole 223 while the auxiliary lid 21 is inserted into the through-hole 223. The vent hole 214 may be formed at a position corresponding to the rotation groove 215. If a plurality of the rotation grooves 215 are formed, the vent holes 214 may be formed in the number corresponding to the rotation grooves. In addition, the vent hole 214 may be positioned above the rotation groove 215. A plurality of vent holes 214 may be formed, and the plurality of vent holes 214 may be positioned in opposite directions.

Meanwhile, the lid rib 213 may be seated on the through-hole seating portion 227 when the auxiliary lid 21 is inserted into the through-hole 223. Therefore, the auxiliary lid 21 can be maintained a state of being inserted into and mounted in the through-hole 223. In addition, when the auxiliary lid 21 is mounted, the lid rib 213 and the main lid 27 may be located on the same plane. Then, the vent hole 214 is exposed to the upper surface of the main lid 20 so that the inside air of the container 10 can flow out to the outside.

A body upper portion 212 forming a portion of the outer surface of the lid body 210 is formed above the lid rib 213. The body upper portion 212 supports the lid upper surface portion 211 and may be exposed to the outside even when the auxiliary lid 21 is inserted into the through-hole 223. In addition, a body lower portion 218 forming a portion of the outer surface of the lid body 210 is formed below the lid rib 213. The body lower portion 218 may form an area of the air chamber 218*a* (see FIG. 18).

In detail, an air chamber 218*a* may be formed below the lid rib 213. The air chamber 218*a* may form a space spaced between the auxiliary lid 21 and the inner wall surface of the through-hole 223 and form an exhaust passage of air flowing through an air vent 217. In addition, the air chamber 218*a* may communicate with a vent hole 214. The air chamber 218*a* is positioned between the lid rib 213 and an airtight portion 216 and may be formed in a shape that is recessed inward along the outer surface of the lid body 210.

The airtight portion 216 may be formed below the air chamber 218*a* and at the lower end of the lid body 210. The airtight portion 216 is for primarily shielding a space between the through-hole 223 and the auxiliary lid 21 and may protrude along the circumference of the lid body 210. In other words, when the auxiliary lid 21 is mounted, the through-hole 223 may be primarily shielded by the airtight portion 216, and may be secondarily shielded by the lid rib 213 seated on the through-hole seating portion 227.

The airtight portion 216 may be formed to have an inclined surface protruding outward from the lower side to the upper side at the lower end of the lid body 210. Therefore, if the auxiliary lid 21 is inserted, the inner surface of the through-hole 223 is in contact with the airtight portion 216. For example, in a state where the auxiliary lid 21 is inserted and mounted, the inclined surface of the airtight portion 216 is in contact with the end portion of the inner lower end portion 228.

Meanwhile, the rotation groove 215 may be formed on an outer surface of the lid body 210. The rotation groove 215 may extend from a central portion of the vent hole 214 to a lower end of the lid body 210 and may be recessed inside the lid body 210. In addition, the rotation groove 215 may be formed at a position corresponding to the rotation protrusion 224, and thus, when the lid body 210 is mounted, the rotation protrusion 224 may be inserted towards the inside of the rotation groove 215.

A plurality of rotation grooves 215 may be formed, and the plurality of rotation grooves 215 may be positioned at positions facing each other. The rotation groove 215 may pass through the air chamber 218*a*, and extend to the lower end of the airtight portion 216, and be opened downward to facilitate insertion of the rotation protrusion 224. In addition, although not illustrated in detail, a groove or a protrusion on which the lid constraining portion 224*a* is locked and constrained may be further formed inside the rotation groove 215.

Meanwhile, an air vent 217 may be further formed on an outer surface of the lid body 210. The air vent 217 may form a passage through which air inside the container 10 passes through the airtight portion 216 to the air chamber 218*a*. In other words, the inlet of the air vent 217 is opened at the lower end of the airtight portion 216, that is, at the lower surface of the lid body 210, and the outlet of the air vent 217 may be opened at the upper end of the airtight portion 216, that is, the surface connected with the air chamber 218*a*.

The inlet and outlet of the air vent 217 may be located at different positions from each other. For example, the inlet and outlet of the air vent 217 may be located on different vertical extension lines. Therefore, a portion of the air and the scattered food flowing into the inlet of the air vent 217 have to change in flow direction while passing through the air vent 217.

In addition, the air vent 217 is formed on the airtight portion 216 and may be located on one side spaced apart from the rotation groove 215. In other words, the air vent 217 may be located at a position away from the vent hole 214 by a predetermined distance.

For example, a pair of rotation grooves 215 and a pair of air vents 217 may be provided. In addition, a pair of the rotation grooves 215 are positioned opposite to each other, and the pair of air vents 217 may be located in the rotating direction by an angle set based on the center of the pair of rotation grooves 215 and the auxiliary lid 21.

Hereinafter, with reference to the drawings, the operation of the lid having the configuration as described above will be described in detail.

Figure 15:
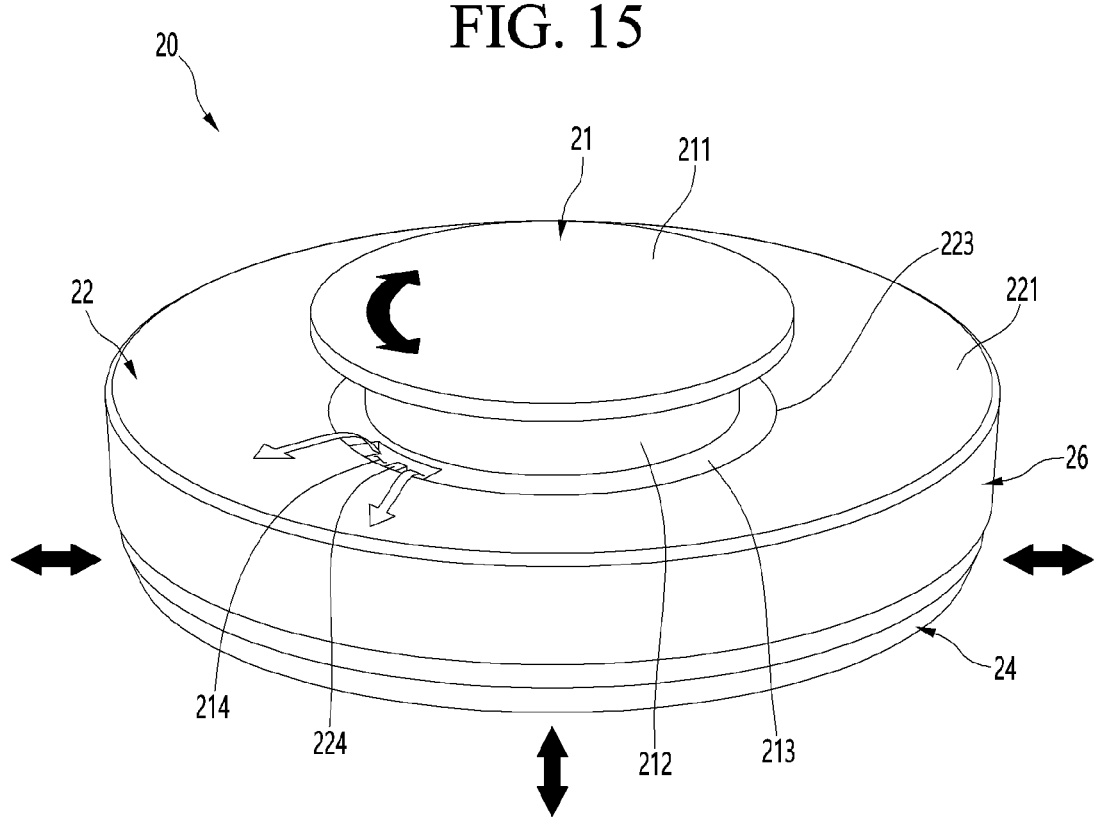
FIG. 15 is a view illustrating an operation state of the lid.

FIG. 15 is a view illustrating an operation state of the lid.

As illustrated in the drawing, the lid 20 is to shield the opened upper surface of the container 10. At this time, when the user holds and rotates the lid top portion 211 in a state where the auxiliary lid 21 is mounted on the through-hole 223 of the main lid 27, the upper body 22 of the main lid 27 may be rotated together.

According to the rotational direction of the upper body 22, the upper body 22 is moved away from or is moved closer relative to the lower body 23. For example, in order to mount the lid 20 on the opened upper surface of the container 10, or to separate the lid 20 in a state mounted on the container 10, the upper body 22 may be moved away relative from the lower body 23.

If the upper body 22 and the lower body 23 are moved away from each other, the central portion 243 of the gasket 24 does not protrude or protrude less to the outside to be easily inserted or separated from the inner surface of the container 10. Therefore, in this state, the user can easily insert the lid 20 into the opening of the container 10 and mount the lid 20 in the opening of the container 10, or the lid 20 can be easily separated from the container in a state where the lid 20 is mounted on the container 10.

Meanwhile, if the upper body 22 and the lower body 23 are moved close to each other, the central portion 243 of the gasket 24 protrudes outwardly or protrudes out further and may be in close contact with the inner wall surface of the container 10 when the lid 20 is inserted in the container 10. In other words, in a state where the lid 20 is inserted into the opened upper surface of the container 10 and is closed when the user holds and rotates the auxiliary lid 21 so that the central portion 243 of the gasket 24 protrudes outward, the space between the container 10 and the lid 20 may be sealed.

In this state, the blade device 14 may be rotated, and food inside the container 10 may be crushed. By the high-speed rotation of the blade device 14, the food inside the container 10 may flow while being scattered, but the lid 20 and the container 10 are maintained in an airtight state to prevent the food inside the container 10 from being leaked or overflowing.

In addition to the operation of determining whether the gasket 24 is sealed through the rotation of the upper body 22, the auxiliary lid 21 can perform the operations such as adding of food inside the container after the user opens the auxiliary lid 21, re-disposing or processing food inside the container 10 using a rod, or the like.

In addition, even in a state that the auxiliary lid 21 is mounted, a structure that communicates with the inside of the container 10 through the air vent 217 and the vent hole 214 is provided, and the air inside the container 10 can be discharged while it is possible to prevent the food inside the container 10 from overflowing or being discharged.

Meanwhile, the upper body 22 and the lower body 23 may be separated from each other when a cleaning operation is required or a service condition or an abnormality occurs, and the main lid 27 may be configured to be capable of being disassembled and assembled.

Figure 16:
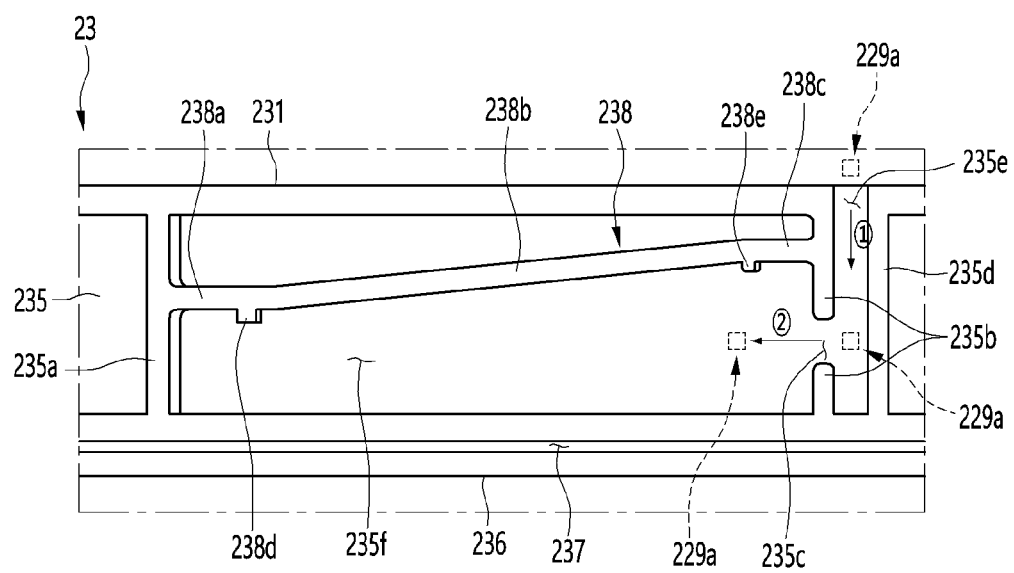
FIG. 16 is a view illustrating a moving state of the lifting and lowering guide when the upper body and the lower body are coupled.

FIG. 16 is a view illustrating a moving state of the lifting and lowering protrusion when the upper body and the lower body are coupled.

As illustrated, the upper body 22 and the lower body 23 may be assembled in a state of being separated from each other, and if the upper body 22 and the lower body 23 have to be aligned and coupled to the correct position when the upper body 22 is rotated, the upper body 22 and the lower body 23 can relatively move so that the distance between the upper body 22 and the lower body 23 increases or decreases.

For the assembly of the main lid 27, first, the deco plate 26 is assembled to the upper body 22, and the gasket 24 may be assembled to the lower body 23 and the gasket fixing member 25.

In addition, in order to couple the upper body 22 and the lower body 23, first, the lifting and lowering projection 229 is positioned at the opened upper side of the protrusion movement passage 235e between the second side rib 235b and the third side rib 235d. Then, when the upper body 22 is moved downward, the lifting and lowering protrusion 229 may be moved in the vertical direction (direction θ in FIG. 16). The upper body 22 is moved downward until the lifting and lowering protrusion 229 reaches a height corresponding to the rib opening 235c.

When the lifting and lowering protrusion 229 is positioned at a height corresponding to the rib opening 235c, the user rotates the upper body 22 in the horizontal direction (direction θ in FIG. 16) and thus the lifting and lowering protrusion 229 may be located inside the protrusion receiving space 235f.

In a state where the lifting and lowering protrusion 229 is disposed in the protrusion receiving space 235f, the upper body 22 is lifted or lowered by rotating the upper body 22, and accordingly, the gasket 24 can be compressed or extended to control the degree of protruding outward.

Meanwhile, in a state where the main lid 27 is closed, most of the main lid 27 is inserted inside the container 10, and the upper surface of the main lid 27 is exposed to the outside. Therefore, the user can hold the auxiliary lid 21 and rotate the upper body 22, and accordingly, the airtight state between the container 10 and the lid 20 due to the selective protrusion of the gasket 24 can be adjusted.

Hereinafter, with reference to the drawing, the manipulation of the airtight state between the container 10 and the lid 20 is described in detail.

Figure 17:
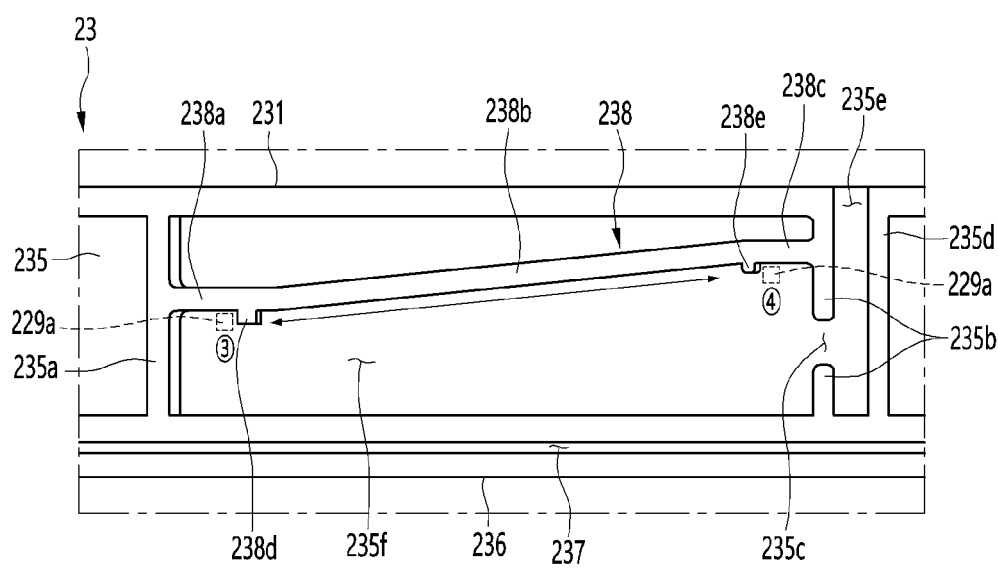
FIG. 17 is a view illustrating a state where the lifting and lowering guide is moved according to the rotation of the upper body.
Figure 18:
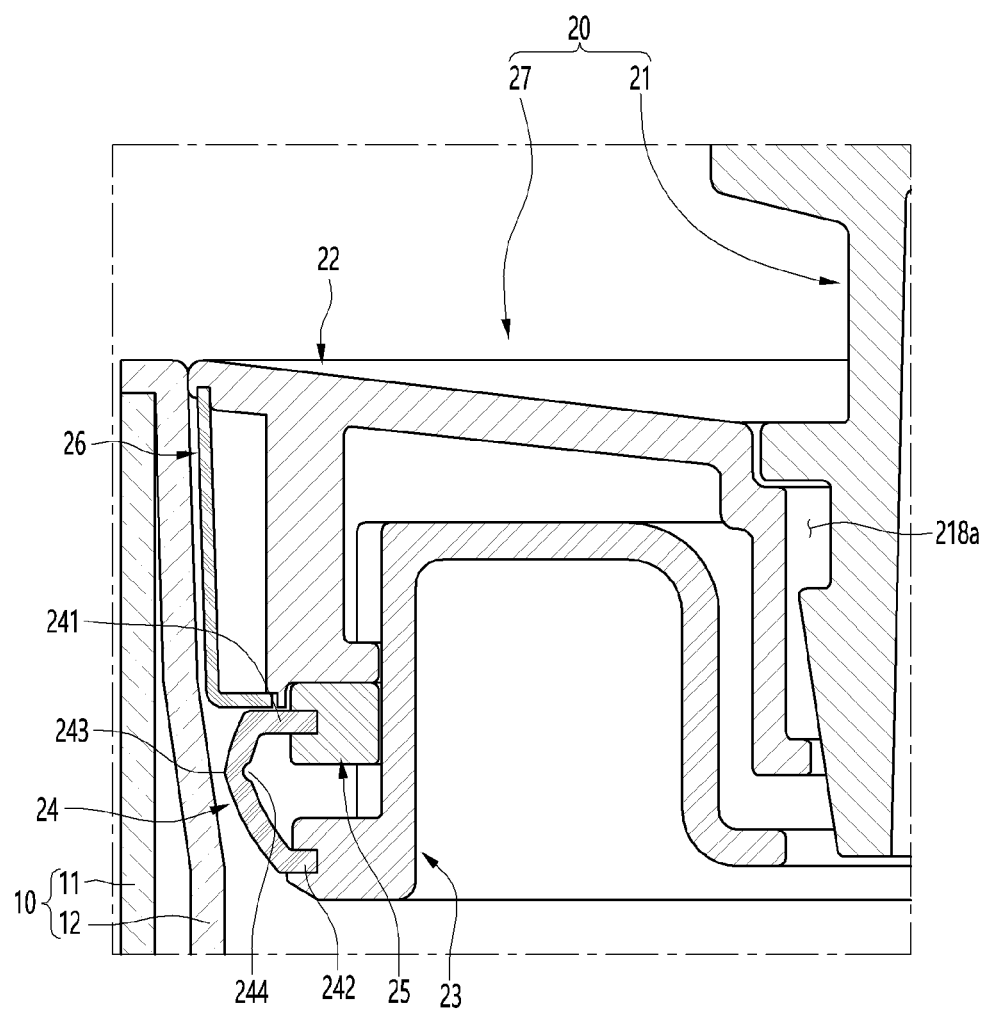
FIG. 18 is a cross-sectional view illustrating a state where the gasket and the inner surface of the container are spaced apart from each other by the forward rotation of the upper body.
Figure 19:
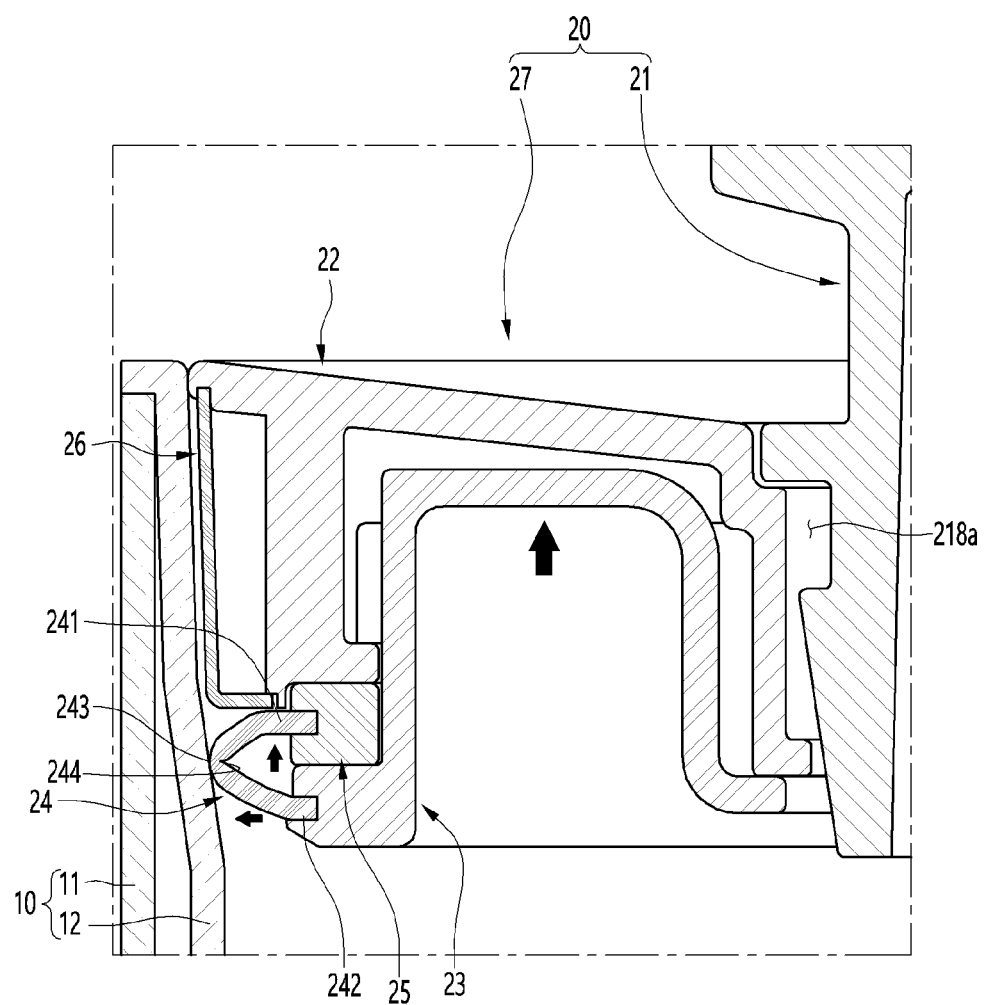
FIG. 19 is a cross-sectional view illustrating a state where the gasket and the inner surface of the container are in close contact with each other by reverse rotation of the upper body.

FIG. 17 is a view illustrating a state where the lifting and lowering protrusion is moved according to the rotation of the upper body, FIG. 18 is a cross-sectional view illustrating a state where the gasket and the inner surface of the container are spaced apart from each other by the forward rotation of the upper body, and FIG. 19 is a cross-sectional view illustrating a state where the gasket and the inner surface of the container are in close contact with each other by reverse rotation of the upper body.

The main lid 27 is completely inserted into the opened upper surface of the container 10 and the user can rotate the upper body 22 through the manipulation of the auxiliary lid 21. Of course, the user may detach or attach the auxiliary lid from or to the main lid 27 by pulling or pressing the auxiliary lid 21 in a state where the main lid 27 has closed the opened upper surface of the container 10.

The user can insert the lid 20 into the opened upper surface of the container 10 as illustrated in FIG. 18 to shield the opened upper surface of the container 10. At this time, the circumference of the main lid 27 may be in a state of being in contact with the inner surface of the container 10, but since the space between the container 10 and the main lid 27 is not completely sealed by the gasket 24, the user can hold the auxiliary lid 21 and lift or insert the main lid 27 since the upper surface of the container 10 can be easily opened and closed. In addition, the opened upper surface of the container 10 may be formed to be inclined, and the main lid 27 may be simply seated on the inclined inner surface of the container 10. In a state where the main lid 27 is seated, the upper surface of the main lid 27 may be located on the same plane as the upper end of the container 10.

In such a state, the upper body 22 and the lower body 23 are in the most distant state, and the gasket 24 may be in an extended state in the vertical direction. In other words, the lifting and lowering protrusion 229 may be in a state located in the horizontal portion 238c. In other words, the lifting and lowering protrusion 229 may maintain the highest position of the protrusion receiving space 235f and be constrained by the upper restraining portion 238e so that the upper body 22 and the lower body 23 can be maintained in the most distant state. Of course, the lifting and lowering protrusion 229 may be located at the upper end of the inclined portion 238b rather than the horizontal portion 238c.

In this state, the center portion 243 of the gasket 24 is separated from the inner surface of the container, and the inside of the container 10 is not sealed or is not completely sealed. Accordingly, the user can easily seat the lid 20 on the opened upper surface of the container 10 or separate the seated lid 20 from the container 10. In addition, since the container 10 is not a state of being sealed, it is preferable that the blade device 14 is not in operation.

Meanwhile, the user rotates the auxiliary lid 21 in the reverse direction for rotating the upper body 22 in a state where the lid 20 is closed so that, as illustrated in FIG. 19, the gasket 24 seals the opened upper surface of the container 10.

In detail, in a state where the lid 20 is seated on the container 10 as illustrated in FIG. 18, the lifting and lowering protrusion 229 is located at the highest position (④ in FIG. 17) of the horizontal portion 238c or the inclined portion 238b. In addition, in this state, if the user holds the auxiliary lid 21 and rotates the auxiliary lid 21 in the reverse direction to make the container 10 airtight, the upper body 22 is rotated in the reverse direction together with the auxiliary lid 21. At this time, the lifting and lowering protrusion 229 is moved along the horizontal portion 238c. If the lifting and lowering protrusion 229 is located at the end of the horizontal portion 238c, the auxiliary lid 21 may be rotated while applying a force to move the lifting and lowering protrusion 229 beyond the upper constraining portion 238e.

Then, the lifting and lowering protrusion 229 may be moved downward along the inclined portion 238b. At this time, since the upper body 22 has a structure supported by the elasticity of the gasket 24, the lifting and lowering protrusion 229 maintains a state of being in contact with the lower surface of the inclined portion 238b, and as the upper body 22 rotates in the reverse direction, the lifting and lowering protrusion 229 moves downward along the inclined portion 238b.

By rotation of the upper body 22, according to the movement of the lower body 23 upward, the gasket 24 may be gradually compressed in the vertical direction. When the gasket upper portion 241 and the gasket lower portion 242 are brought closer, the central portion 243 may protrude outward accordingly. At this time, the gasket 24 may be more easily compressed by the gasket groove 244 inside the gasket 24 corresponding to the center portion 243, so that the center portion 243 may protrude outward.

When the upper body 22 is rotated to its complete reverse direction by the rotational manipulation of the auxiliary lid 21, the lifting and lowering protrusion 229 may be located at the lowest end of the inclined portion 238b, or the lower horizontal portion 238a (the position of ③ in FIG. 17). In order for the lifting and lowering protrusion 229 to be located at the lower horizontal portion 238a, the auxiliary lid 21 is rotated in the reverse direction by applying force to the auxiliary lid 21 so that the lifting and lowering protrusion 229 moves beyond the lower constraining portion 238d to the lower horizontal portion 238a. In addition, even if the upper body 22 is no longer rotated, the lifting and lowering protrusion 229 may be constrained by the lower constraining portion 238d, and thus the lower body 23, by the elasticity of the gasket 24, may be prevented from descending arbitrarily.

When the lifting and lowering protrusion 229 is located at the lower end of the lower horizontal portion 238a or the inclined portion 238b, the gasket 24 is in the most compressed state, and the central portion 243 of the gasket 24 may be in the most protruding state, as illustrated in FIG. 19. At this time, the gasket groove 244 is in a narrowed state by the deformation of the gasket 24, and the central portion 243 may be a state of protruding outward from the main lid 27. In other words, the gasket 24 may protrude more than the circumference of the outer surface of the main lid 27 to be in close contact with the inner surface of the container 10 and may completely seal between the circumferences of the container 10 and the lid 20. In addition, by the close contact of the gasket 24, the main lid 27 can be fixed to the container 10, and even if the blade device 14 is operated, the main lid 27 can maintain a state of being closed without being separated arbitrarily.

Figure 25:
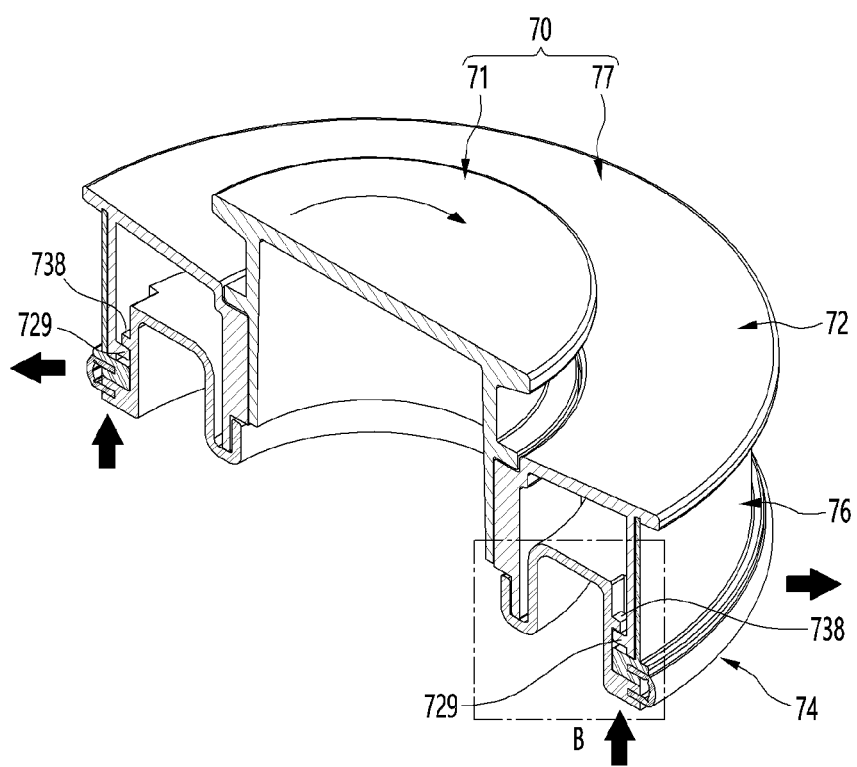
FIG. 25 is a cross-sectional view illustrating a state where the distance between the upper body and the lower body decreases by the reverse rotation of the upper body.

Meanwhile, in order to remove the food from the container 10 or to perform other operation after the operation of the blade device 14 is completed, the lid 20 may be separated from the container 10. At this time, in a state as illustrated in FIG. 25, the auxiliary lid 21 can be held and rotated in the forward direction, and the upper body 22 is rotated together with the auxiliary lid 21 in the forward direction.

By the rotation of the upper body 22, the lifting and lowering protrusion 229 is moved from a low position to a high position along the lifting and lowering guide 238, the gasket 24 is extended while the lower body 23 is moved downward. When the upper body 22 is completely rotated in the forward direction, it becomes in a state as illustrated in FIG. 18, and the lid 20 is not in an airtight state with the container 10 so that the user can easily separate the lid 20 from the container 10.

Meanwhile, the lid according to an embodiment of the present disclosure may have various other embodiments in addition to the above-described embodiment. Other embodiments of the present disclosure differ only in the structure of the lid, and other structures except the lid may be the same as the above-described embodiment, and thus descriptions of other components except the lid will be omitted.

Hereinafter, the lid of the blender according to another embodiment of the present disclosure will be described with reference to the drawing.

Figure 20:
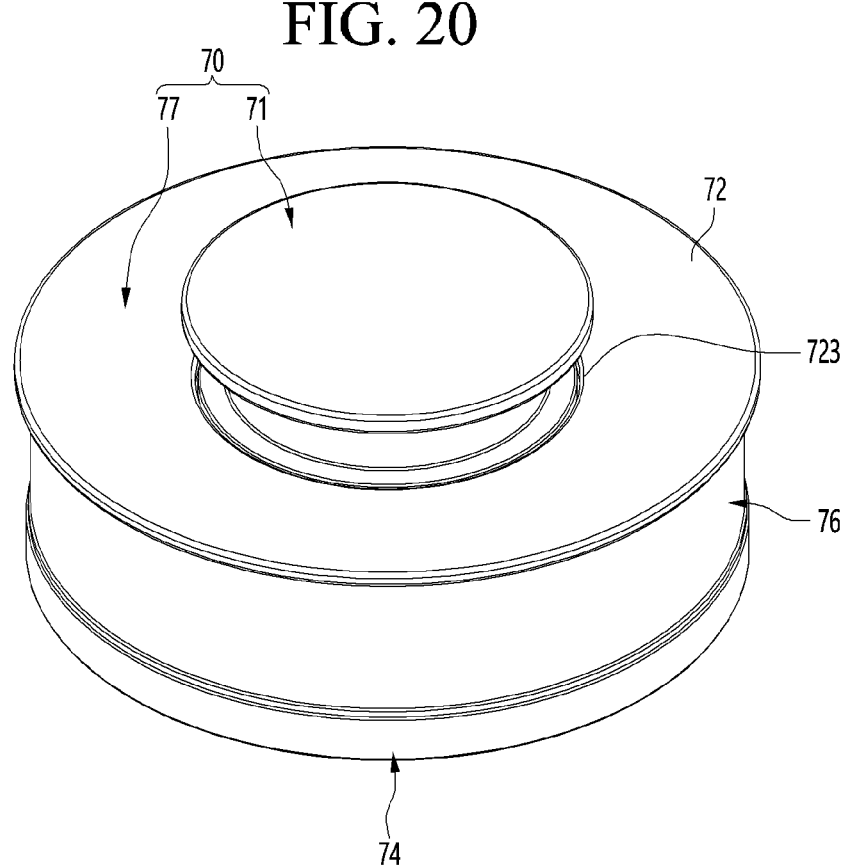
FIG. 20 is a perspective view illustrating a lid according to another embodiment of the present disclosure.
Figure 21:
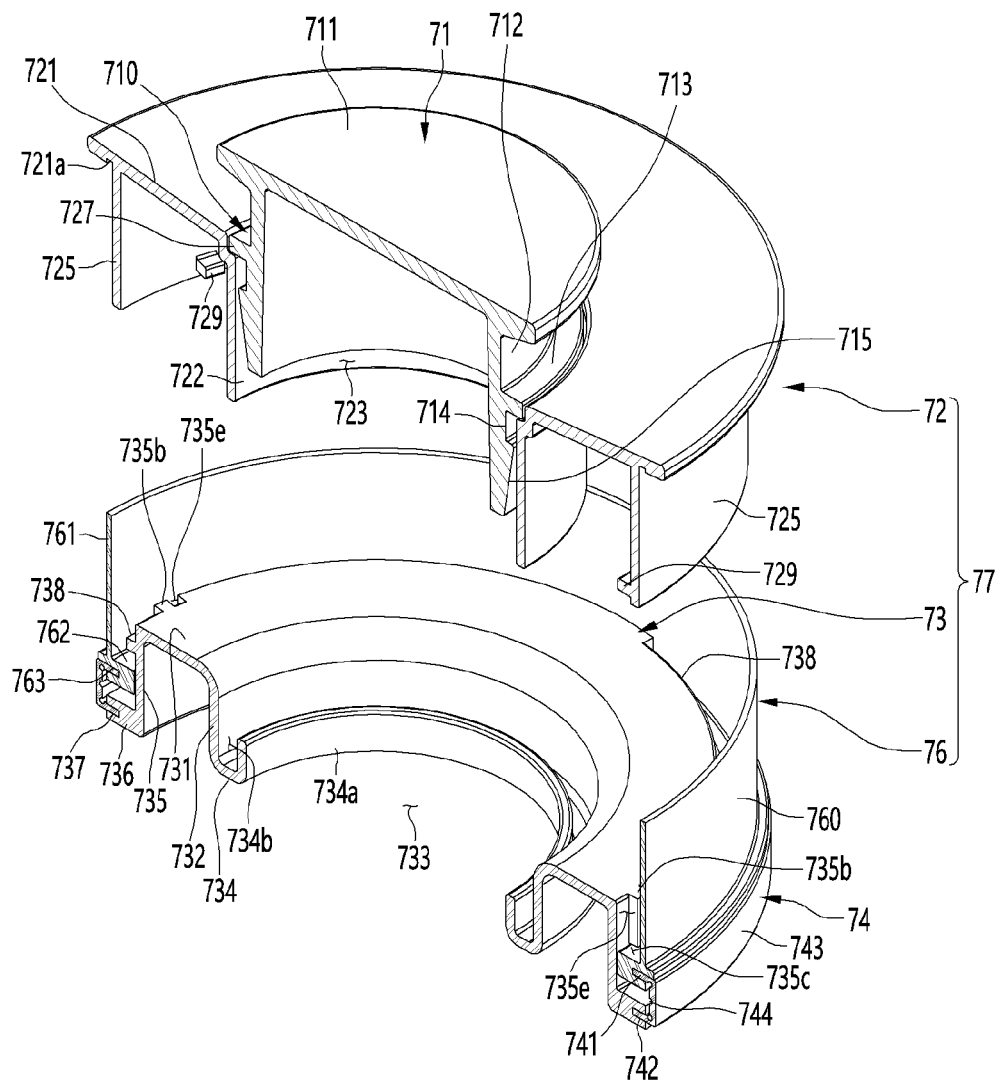
FIG. 21 is an exploded perspective view of the upper body and the lower body of the lid.

FIG. 20 is a perspective view illustrating a lid according to another embodiment of the present disclosure, and FIG. 21 is an exploded perspective view of the upper body and the lower body of the lid.

As illustrated, the lid 70 may be composed of a main lid 77 and an auxiliary lid 71 that shields through-holes 723 and 733 formed in the center of the main lid 77 as a whole. The auxiliary lid 71 may be provided detachably to the main lid 77, and the food can be added or the access into the inner portion of the container 10 can be performed without opening the main lid 77 by opening and closing the through-holes 723 and 733.

In a state where the auxiliary lid 71 is mounted to shield the through-holes 723 and 733, the auxiliary lid 71 may be coupled with the main lid 77, and an upper portion of the auxiliary lid 71 protrudes upward and thus may be formed so that the user can hold the upper portion of the auxiliary lid 71 to manipulate in order to rotate the upper body 72 constituting the main lid 77. Therefore, since the auxiliary lid 71 functions to open and close the through-holes 723 and 733, the auxiliary lid 71 may be called a stopper or a cap and since the auxiliary lid 71 is held and rotated by the user in order to rotate the upper body 72, the auxiliary lid 71 may be also called a handle.

The auxiliary lid 71 may include a lid upper surface portion 711 forming an upper surface and a lid body 710 extending downward from the lid upper surface portion 711. The lid body 710 may be inserted into the through-holes 723 and 733 to shield the through-holes 723 and 733. In addition, the lid upper surface portion 711 may be formed to be larger than the cross-section of the lid body 710 and protrude outside the lid body 710 so that the user can hold the lid upper surface portion 711.

The lid body 710 may have a lid rib 713 protruding outward. The lid rib 713 may be formed along the circumference of the lid body 710 and may be seated on a rib seating portion 727 stepped on the upper end of the through-hole 723. The lid body 710 may be composed of a body upper portion 712 and a body lower portion 714 based on the lid rib 713. In addition, the circumference of the body lower portion 714 may be formed to be inclined to facilitate insertion into the through-holes 723 and 733. In addition, a body recessed portion 715 recessed inward may be formed at a lower end of the body lower portion 714, and an inner surface of the through-hole 733 is press-fit into the body recessed portion 715 when the auxiliary lid 71 is coupled to the main lid 77.

The auxiliary lid 71 and the main lid 77 may be a state of being coupled to each other, and the upper body 72 constituting the main lid 77 may be rotated when the auxiliary lid 71 is rotated. Meanwhile, although not illustrated in detail, in order for the auxiliary lid 71 and the main lid 77 to be coupled to each other, the auxiliary lid 71 and the main lid 77 may have rotation grooves 215 (FIG. 9) and a rotation protrusion 224 (FIG. 9), as in the above-described embodiment.

Meanwhile, the main lid 77 may be formed in a size corresponding to the opened upper surface of the container 10, and the main lid 77 may include the upper body 72, a lower body 73, and a gasket fixing member 76.

The upper body 72 forms an upper portion of the main lid 77 and may be rotatably coupled with the lower body 73. The through-hole 723 may be opened at the center of the upper body 72. In addition, the upper body 72 may have a top plate 721 formed on an upper surface, and an upper inner part 722 extending downward along an inner circumference of the top plate 721. In addition, an upper outer part 725 extending downward from a position spaced apart from the upper inner part 722 may be formed on a lower surface of the top plate 721. The upper inner part 722 may form an inner surface of the through-hole 723. In addition, the upper outer part 725 may be formed to be covered by the gasket fixing member 76.

In addition, a lifting and lowering protrusion 729 protruding inward may be formed on an inner surface of the upper outer part 725. The lifting and lowering protrusion 729 is formed at the lower end of the upper outer part 725 and is in contact with a lifting and lowering guide 738, which will be described below, to allow relative lifting and lowering between the upper body 72 and the lower body 73. The lifting and lowering protrusion 729 may be formed at a position corresponding to the lifting and lowering guide 738. For example, a pair of lifting and lowering protrusions 729 may be provided and protrude from opposite directions and with corresponding pair of lifting and lowering guides 738, guide stable rotation of the upper body 72.

Meanwhile, a fixing member groove 721a may be formed at an outer end of the lower surface of the top plate 721. The upper end of the gasket fixing member 76 is received in the fixing member groove 721a, and the fixing member groove 721a prevents separation of the gasket fixing member 76 and the upper body 72 supported by the gasket fixing member 76. The fixing member groove 721a is formed to have a somewhat larger size than the upper end of the gasket fixing member 76 so that the upper body 72 can be rotated smoothly in a state of being supported by the gasket fixing member 76.

A gasket fixing member 76 may be provided between the upper body 72 and the lower body 73. The gasket fixing member 76 may include a fixing member circumferential portion 761 which extends in the vertical direction and forms a circumferential surface shape of the lid 70 and a fixing member coupling portion 762 which is formed on the lower end of the fixing member circumferential portion 761 and to which an upper end of a gasket 74 is fixed.

The fixing member circumferential portion 761 may extend such that an upper end thereof is inserted into the fixing member groove 721a of the upper body 72. Therefore, the fixing member circumferential portion 761 may form an outer appearance of the circumference of the side surface of the main lid 77. In addition, a deco member 760 may be provided on the fixing member circumferential portion 761. The deco member 760 may form an outer appearance of the circumference of the main lid 77 and may be made of a plate-like metal material or a film material having a metal texture to be attached to the fixing member circumferential portion 761.

The fixing member coupling portion 762 is formed at the lower end of the fixing member circumferential portion 761 and may extend in a direction intersecting the extending direction of the fixing member circumferential portion 761. The lower end of the fixing member coupling portion 762 may be adjacent to the lower body 73 and may be in contact with the lower body 73 according to the lifting and lowering of the lower body 73. In addition, an upper fixing groove 763 may be formed at an outer end of the fixing member coupling portion 762. an upper end of the gasket 74 is constrained to the upper fixing groove 763 so that the gasket 74 may be maintained in a coupled state with the gasket fixing member 76.

The gasket 74 may include a gasket upper portion 741 and a gasket lower portion 742 based on the center thereof. The end portions of the gasket upper portion 741 and the gasket lower portion 742 may extend inward, respectively. In addition, the gasket 74 may further include a central portion 743 that connects the gasket upper portion 741 and the gasket lower portion 742 and makes contact with the inner surface of the container 10.

The extended end portion of the gasket upper portion 741 may be fixed by being inserted into the upper fixing groove 763 of the gasket fixing member 76. In addition, the extended end portion of the gasket lower portion 742 may be fixed by being inserted into the lower fixing groove 737 formed at the lower end of the lower body 73. Therefore, according to the relative movement of the upper body 72 and the lower body 73 in the vertical direction, the distance between the gasket upper portion 741 and the gasket lower portion 742 may decrease or increase, and the central portion of the gasket 74 may optionally protrude outward.

Meanwhile, a gasket groove 744 may be formed on an inner surface of the central portion 743 of the gasket. The gasket groove 744 may be recessed at a central point between the gasket upper portion 741 and the gasket lower portion 742. In addition, the gasket groove 744 is formed along the central portion 743 so that when the gasket 74 is compressed in the vertical direction, the central portion 743 protrudes outward. In addition, an additional auxiliary gasket groove 745 may be further formed at a point where the central portion 743 meets the upper portion of the gasket 741 and at a point where the central portion 743 meets the lower portion of the gasket 742. Thus, the gasket 74 is more easily compressed in the vertical direction and the central portion 743 can protrude outward due to the auxiliary gasket groove 745.

The lower body 73 is provided below the upper body 72 and forms the lower portion of the main lid 77. The lower body 73 may form a lower surface of the lid 70 and may support a portion of the upper body 72 from below. In addition, the lifting and lowering guide 738 which can be relatively lifted and lowered with the upper body 72 when the upper body 72 is rotated may be formed on the lower body 73.

In detail, the lower body 73 may include a bottom plate 731 forming an upper surface of the lower body 73, a lower inner part 732 formed at an inner end of the bottom plate 731, and a lower outer part 735 formed at an outer end thereof. In addition, the bottom plate 731, the lower inner part 732, and the lower outer part 735 may be inserted into the upper body 72.

The bottom plate 731 may be disposed in parallel with the top plate 721 and may be formed to have a smaller width than the top plate 721. The lower inner part 732 may extend vertically downward from the inner end of the top plate 721. In addition, an inner extension portion 734 bent inward may be formed at a lower end of the lower inner part 732, and an inner rib 734a may be extended upward at an extended end portion of the inner extension portion 734. Accordingly, an inner space 734b opened upward by the lower inner part 732, the inner extension portion 734, and the inner rib 734a may be formed.

The lower end of the upper inner part 722 of the upper body 72 may be inserted into the inner space 734b. The inner rib 734a extends in the vertical direction so that the upper inner part 722 is received so as not to fall out even during the relative movement of the upper body 72 or the lower body 73 in the vertical direction. Therefore, it is possible to maintain a coupling relationship with the upper body 72 and to enable stable rotation of the upper body 72.

Meanwhile, the through-hole 733 may be formed inside the lower inner part 732 and the inner rib 734a.

In addition, the lower outer part 735 may be extended downward from the outer end of the bottom plate 731. The lower outer part 735 may extend parallel with the lower inner part 732. The lower outer part 735 may extend to a height corresponding to the lower inner part 732 or slightly lower in height than the lower inner part 732.

A fixing member support portion 736 bent outward may be formed at the lower end of the lower outer part 735. The fixing member support portion 736 may be selectively in contact with the gasket fixing member 76 and support the gasket fixing member 76 from below when the lower body 73 is lifted and lowered. In addition, the fixing member support portion 736 is positioned at a position facing the lower surface of the fixing member coupling portion 762 and may be extended in parallel with the fixing member coupling portion 762. In addition, the fixing member support portion 736 may protrude by the same distance as the protruding end portion of the fixing member coupling portion 762. A lower fixing groove 737 may be formed at a protruding end portion of the fixing member support portion 736. The end portion of the gasket lower portion 742 may be inserted into and fixed to the lower fixing groove 737. Therefore, the gasket 74 may be compressed and extended when the lower body 73 is lifted and lowered.

Meanwhile, the lifting and lowering guide 738 may be provided on a circumferential surface of the lower outer part 735. The lifting and lowering guide 738 is in contact with the lifting and lowering protrusion 729 when the upper body 72 is rotated so that the distance between the upper body 72 and the lower body 73 can be adjusted. In other words, the lifting and lowering guide 738 may guide the lower body 73 according to the rotation of the upper body 72 to enable relative movement in the vertical direction.

The lifting and lowering guide 738 may be formed on the outer surface of the lower body 73, that is, on the circumferential surface of the lower outer part 735. A pair of lifting and lowering guides 738 may be formed on the opposite surfaces, thus the lifting and lowering guide 738 may guide so that a stable coupling relationship with the upper body 72 is maintained and the rotation of the upper body 72 is stably performed. Of course, only one lifting and lowering guide 738 may be formed.

Hereinafter, with reference to the drawing, the lifting and lowering guide 738 will be described in more detail.

Figure 22:
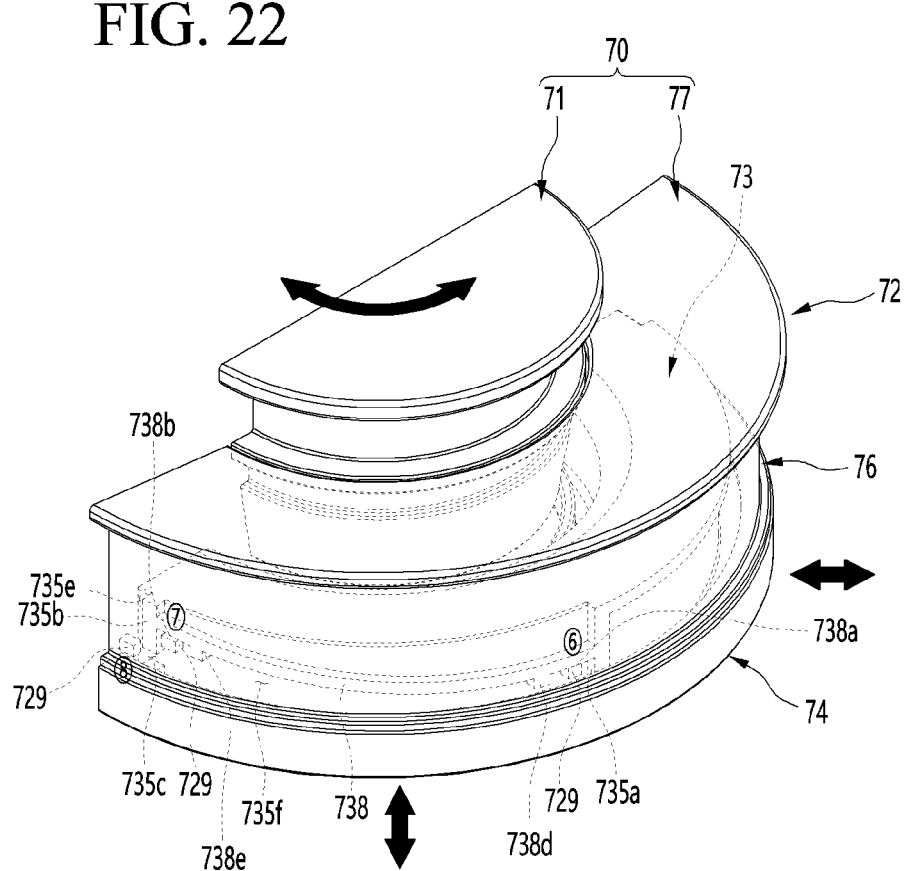
FIG. 22 is a perspective view illustrating a lifting and lowering guide of the lower body.

FIG. 22 is a perspective view illustrating a lifting and lowering guide of the lower body.

As illustrated, the lifting and lowering guide 738 is formed on the outer surface of the lower outer part 735 and may be located at the inner side facing the upper outer part 725.

The lifting and lowering guide 738 may be located on a path where the lifting and lowering protrusion 729 is moved. In addition, the lifting and lowering guide 738 may protrude outward along the circumference of the lower outer part 735 and may be formed over a predetermined section in which the upper body 72 is rotated. The lifting and lowering guide 738 has one end positioned above the other end and may be formed to have a predetermined slope. Since the lower surface of the lifting and lowering guide 738 is in contact with the lifting and lowering protrusion 729, at least the lower surface of the lifting and lowering guide 738 may be formed to have a slope.

In addition, an upper constraining portion 738e and a lower constraining portion 738d may be formed at the upper end and the lower end of the lifting and lowering guide 738. The upper constraining portion 738e and the lower constraining portion 738d may be formed in a protrusion shape protruding downward and constrain the lifting and lowering protrusion 729 moved along the lifting and lowering guide 738. In detail, the lifting and lowering protrusion 729 moved according to the rotation of the upper body 72 may be in contact with the upper constraining portion 738e or the lower constraining portion 738d, and, in this state, if a force is applied to the upper body 72, and thus the upper body is further rotated, the lifting and lowering protrusion 729 may be moved to the upper receiving space 738b or the lower receiving space 738a formed on the respective upper end and the lower end of the lifting and lowering guide 738 over the respective upper constraining portion 738e and the lower constraining portion 738d. In this state, the distance between the upper body 72 and the lower body 73 may be maintained. In addition, the gasket 74 may maintain a deformed state.

Meanwhile, a first side rib 735a and the second side ribs 735b may be provided at both left and right ends of the lifting and lowering guide 738, respectively. The first side rib 735a and the second side rib 735b extend in the vertical direction from the outer surface of the lower outer part 735 and may protrude to a height corresponding to the lifting and lowering guide 738.

The first side rib 735a may be in contact with the lower end of the opposite ends of the lifting and lowering guide 738, and the second side rib 735b may be in contact with the higher end of the opposite ends of the lifting and lowering guide 738. Accordingly, a protrusion receiving space 735f in which the lifting and lowering protrusion 729 is received may be formed between the lifting and lowering guide 738, the first side rib 735a, and the second side rib 735b.

In addition, a rib opening 735c may be formed on the second side rib 735b. The rib opening 735c may be formed at a position communicating with the protrusion receiving space 735f as a passage through which the lifting and lowering protrusion 729 enters and exits when the upper body 72 and the lower body 73 are assembled and may be opened at a position adjacent to the lower end of the lower body 73.

In addition, a protrusion movement passage 735e may be formed outside the second side rib 735b. The protrusion movement passage 735e may extend in the vertical direction and may be opened on the upper surface of the lower body 73. In addition, the protrusion movement passage 735e may communicate with the rib opening 735c.

Accordingly, when the upper body 72 and the lower body 73 are coupled, the user can arrange the lifting and lowering protrusion 729 to be inserted through the protrusion movement passage 735e. Then, the lifting and lowering protrusion 729 may be received inside the protrusion receiving space 735f through the rib opening 735c by being located at a position (position of ⑤ in FIG. 22) corresponding to the rib opening 735c through the protrusion movement passage 735e.

In a state where the lifting and lowering protrusion 729 is received in the protrusion receiving space 735f, the lifting and lowering protrusion 729 can maintain a state of being in contact with the lifting and lowering guide 738 by the elasticity of the gasket 74. In addition, in a state where the lifting and lowering protrusion 729 is in contact with the lifting and lowering guide 738, the user can rotate the auxiliary lid 71 to rotate the upper body 72, and while the lower body 73 is moved in the vertical direction, the gasket 74 is compressed or extended to adjust an airtightness state between the container 10 and the lid 70.

Hereinafter, with reference to the drawing, the state of the gasket 74 according to the rotation of the lid 70 will be described with reference to the drawing.

Figure 23:
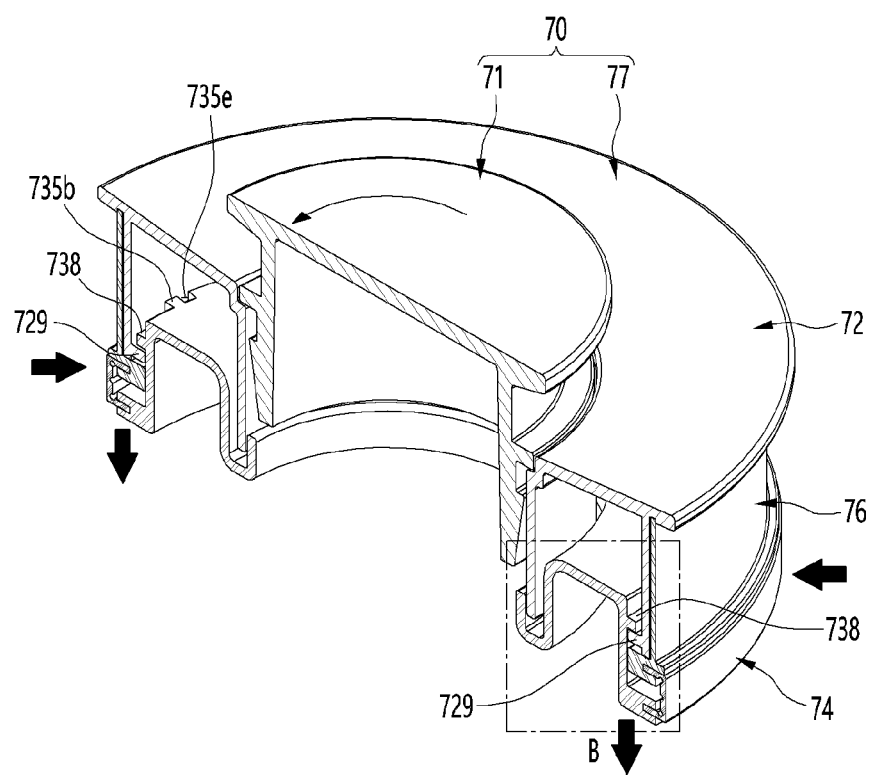
FIG. 23 is a cross-sectional view illustrating a state where the distance between the upper body and the lower body increases by forward rotation of the upper body.
Figure 24:
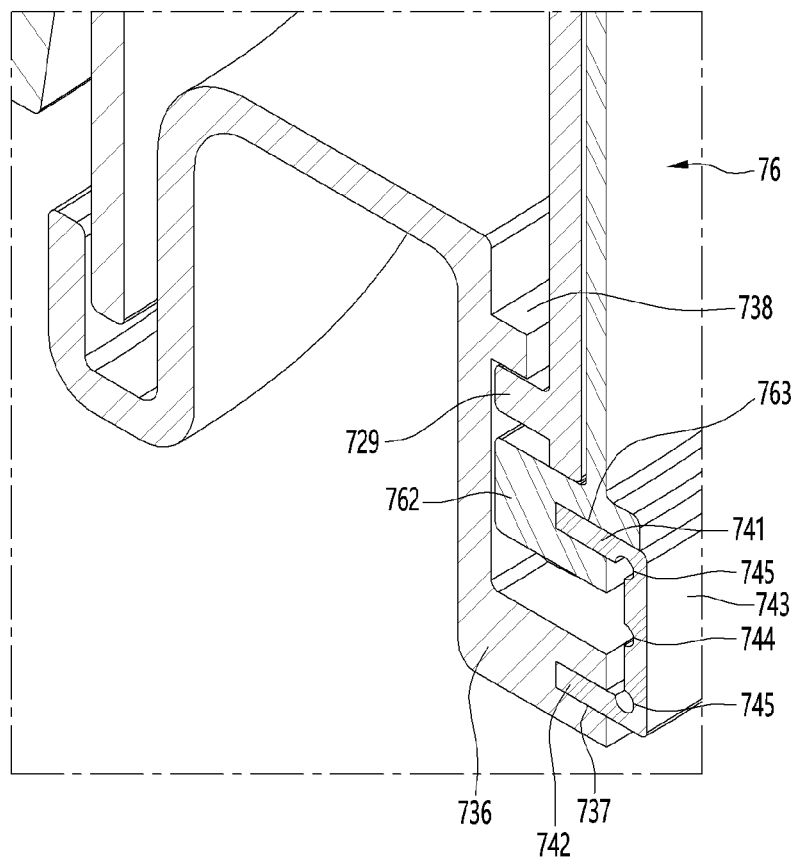
FIG. 24 is an enlarged view of part B of FIG. 23.

FIG. 23 is a cross-sectional view illustrating a state where the distance between the upper body and the lower body increases by forward rotation of the upper body, and FIG. 24 is an enlarged view of part B of FIG. 23.

The user inserts the lid 70 into the opened upper surface of the container 10 to shield the opened upper surface of the container 10. At this time, the circumference of the main lid 77 may be in a state of being in contact with the inner surface of the container 10, but since the space between the container 10 and the main lid 77 is not completely in close contact with each other, the user can easily open and close the upper surface of the container 10 by holding the auxiliary lid 71 and lifting or inserting the main lid 77.

This state is a state where the upper body 72 and the lower body 73 are in the most distant state, and the gasket 74 may be in an extended state in the vertical direction. In other words, the lifting and lowering protrusion 729 may be in a state of being located on the upper end (position of ⑦ in FIG. 22) of the lifting and lowering guide 738. In other words, the lifting and lowering protrusion 729 maintains the highest position in the protrusion receiving space 735f, and the distance between the upper body 72 and the lower body 73 may be maintained in the most distant state through constraining by the upper constraining portion 738e.

In this state, the central portion 743 of the gasket 74 is separated from the inner surface of the container 10 so that the inside of the container 10 is not completely sealed. Therefore, the user can easily seat the lid 70 on the opened upper surface of the container 10 or separate the lid 70 in a state of being seated from the container 10. In addition, since the container 10 is not in an airtight state, it is preferable that the blade device (14 in FIG. 3) is not operated.

Meanwhile, the user rotates the auxiliary lid 71 in the reverse direction to operate the blender 1 in a state where the lid 70 is closed as illustrated in FIG. 23, so that the lid 70 seals the opened upper surface of the container 10.

In detail, in a state where the lid 70 is seated on the container 10, the lifting and lowering protrusion 729 is positioned at the highest position of the lifting and lowering guide 738. In addition, in this state, when the user holds the auxiliary lid 71 and rotates the auxiliary lid 71 in the reverse direction in order to seal the container 10, the upper body 72 is rotated in the reverse direction along with the auxiliary lid 71. At this time, the lifting and lowering protrusion 729 moves downward along the lifting and lowering guide 738.

At this time, since the upper body 72 has a structure of being supported by the gasket fixing member 76 coupled with the gasket 74, the upper body 72 can be pressed upward by the elastic force of the gasket 74. Then, the lifting and lowering protrusion 729 maintains a state of being in contact with the lower surface of the lifting and lowering guide 738, and as the upper body 72 rotates in the reverse direction, the lifting and lowering protrusion 729 moves downward along the lifting and lowering guide 738. As the upper body 72 rotates in the reverse direction so that the lower body 73 moves upward, the gasket 74 may be gradually compressed in the vertical direction.

Figure 26:
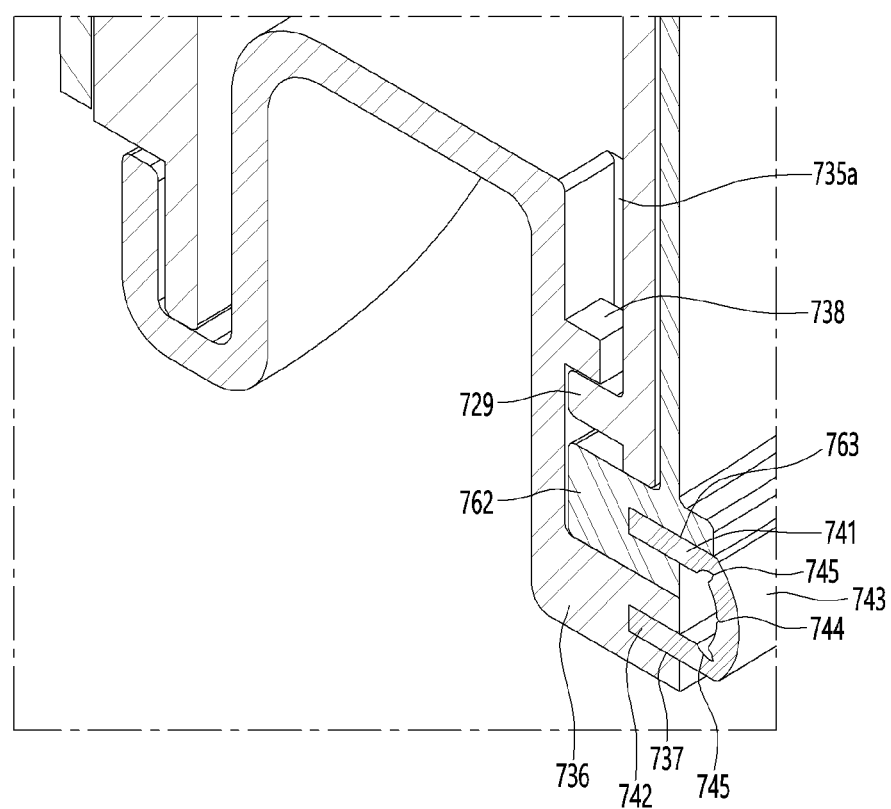
FIG. 26 is an enlarged view of part C of FIG. 25.

FIG. 25 is a cross-sectional view illustrating a state where the distance between the upper body and the lower body has decreased by the reverse rotation of the upper body, and FIG. 26 is an enlarged view of part C of FIG. 25.

As illustrated in the drawing, when the gasket upper portion 741 and the gasket lower portion 742 are brought closer by the reverse rotation of the upper body 72, the center portion 743 may protrude outward accordingly. At this time, the gasket 74 may be more easily compressed by the gasket groove 744 and the auxiliary gasket groove 745 inside the gasket 74, and the central portion 743 protrudes outward.

When the upper body 72 is rotated completely in the reverse direction by the rotational manipulation of the auxiliary lid 71, as illustrated in FIG. 25, the lifting and lowering protrusion 729 is located at the lowermost end (the position of ⑥ in FIG. 22) of the lifting and lowering guide 738.

In addition, even if the upper body 72 is no longer rotated, the lifting and lowering protrusion may be constrained by the lower constraining portion 738d, and thus the lower body can be prevented from descending arbitrarily, by the elasticity of the gasket 74.

When the lifting and lowering protrusion 729 is located at the lower end of the lifting and lowering guide 738, the gasket 74 is in the most compressed state, as illustrated in FIG. 26, and the central portion 743 of the gasket 74 may be the most protruding state outward. At this time, the gasket groove 744 and the auxiliary gasket groove 745 are in a narrowed state due to the deformation of the gasket 74, and the central portion 743 may be a state of protruding outward of the main lid 77. In other words, the central portion 743 may protrude more than the circumference of the outer surface of the main lid 77 to be in close contact with the inner surface of the container 10, and the space between the circumferences of the container 10 and the lid 70 is completely sealed. In addition, by the close contact of the gasket 74, the main lid 77 can be fixed to the container 10, and even if the blade device 14 is operated, the main lid 77 is maintained a state of being closed without being arbitrarily separated.

Meanwhile, when the operation of the blade device 14 is completed, to take food out of the container or perform other work, the lid 70 may be separated from the container 10. At this time, in a state as illustrated in FIG. 25, the auxiliary lid can be held and rotated in the forward direction as illustrated, and the upper body 72 rotates together with the auxiliary lid 71 in the forward direction.

By the rotation of the upper body 72, the lifting and lowering protrusion 729 moves from a low position to a high position along the lifting and lowering guide 738, and the lower body 73 is moved downward while the gasket 74 is extended. When the upper body 72 is completely rotated in the forward direction, the upper body 72 is in a state as illustrated in FIG. 23, and the lid 70 is in a state of being not sealed with the container 10 so that the user can easily separate the lid 70 from the container 10 to open the opened upper surface of the container 10.

Meanwhile, a blender according to the present disclosure may include a container of which an upper surface is opened to form a space in which food is received and which is seated on the blender main body in which a motor assembly is provided, a blade device mounted to penetrate the bottom surface of the container and connected to the motor assembly to be rotated when the container is seated, and a lid configured to shield the opened upper surface of the container, in which the lid may include a main lid seated on the container and having a through-hole opened to communicate with an inside of the container, a gasket provided around the main lid and being in contact with the inner surface of the container, and an auxiliary lid inserted into the through-hole to shield the through-hole and exposed from the upper surface of the main lid, in which the auxiliary lid may be coupled to the main lid and rotated together with the main lid in a state of being inserted into the through-hole, and in which the gasket may protrude to be in close contact with the inner surface of the container according to a rotational manipulation of the auxiliary lid.

A rotation protrusion may protrude inside the through-hole, and a rotation groove into which the rotation protrusion may be inserted to constrain the auxiliary lid is formed on the circumference of the auxiliary lid.

A plurality of rotation protrusions and a plurality of rotation grooves may be formed, and the plurality of rotation protrusions and the plurality of rotation grooves may be respectively disposed in opposite directions to each other.

The rotation groove may be opened from a lower end of the outer surface of the auxiliary lid and extend in the insertion direction of the auxiliary lid.

The rotation protrusion may extend from the lower end to the upper end of the through-hole.

A lid constraining portion that protrudes further from the rotation protrusion and that locks to the inside of the rotation groove may be formed.

A lid rib protruding outward may be formed around the auxiliary lid, a rib seating portion on which the lid rib is seated may be formed on an upper end of the through-hole, and the upper surface of the auxiliary lid may protrude upward more than the upper surface of the main lid in a state where the lid rib is seated on the rib seating portion.

A vent hole may be opened in the lid rib corresponding to the position of the rotation groove to allow air inside the container to be discharged to the outside.

An air vent which is recessed to communicate with the vent hole and is opened to the lower surface of the auxiliary lid to guide the air inside the container to the vent hole is formed around the auxiliary lid, and the air vent may be disposed at a position away from the vent hole in the vertical direction.

The main lid may include an upper body forming an upper portion of the main lid, a lower body forming a lower portion of the main lid and coupled to the upper body to be capable of rotating and moving relative to each other, and a gasket fixing member formed in a ring shape and provided between the lower body and the upper body, and the gasket may have an upper end which is constrained around the gasket fixing member and a lower end which is constrained around the lower body to be compressed or extended according to lifting and lowering of the lower body.

A lifting and lowering protrusion protruding inward may be formed on an inner surface of the upper body, and a lifting and lowering guide that is formed to be inclined and guides the lifting and lowering protrusion when the upper body rotates to lift and lower the lower body may be provided on an outer surface of the lower body.

A plurality of lifting and lowering protrusions and a plurality of lifting and lowering guides may be respectively formed, and each lifting and lowering protrusion and each lifting and lowering guide may be formed at opposite positions to each other.

The lifting and lowering guide may include an inclined portion extending obliquely along the circumference of the lower body, an upper constraining portion protruding downward from the upper end of the inclined portion and constraining downward movement of the lifting and lowering protrusion, and a lower constraining portion protruding upward from the lower end of the inclined portion and constraining the upward movement of the upper protrusion.

The lifting and lowering guide may include an inclined portion extending obliquely along the circumference of the lower body, an upper horizontal portion extending horizontally with the upper surface of the lower body at the upper end of the inclined portion, and a lower horizontal portion extending horizontally with the upper surface of the lower body at the lower end of the inclined portion.

A first side rib and a second side rib extending in the vertical direction may be formed at the opposite ends of the lifting and lowering guide, and a rib opening may be formed on the second side rib so that the lifting and lowering protrusion can enter and exit.

A protrusion movement passage which is opened at an upper end of the lower body and communicates with the rib opening to guide movement of the lifting and lowering protrusion when the upper body and the lower body are assembled may be formed on a side of the second side rib.

The gasket fixing member may be formed in a ring shape and support the lower end of the upper body.

A deco plate forming an outer appearance of the circumferential surface of the main lid may be provided on the outer surface of the upper body.

The gasket fixing member may include a fixing member circumferential portion extending in the vertical direction along the circumference of the upper body to form a circumferential surface of the main lid, and a fixing member coupling portion supporting the upper body at a lower end of the fixing member circumferential portion and to which the upper end of the gasket is fixed.

The gasket may include a gasket upper portion which is extended upward and in which the extended end portion is coupled to the gasket fixing member, and gasket lower portion which is extended downward and in which the extended end portion is coupled to the end portion of the lower body.

According to the rotation of the upper body, the protruding degree of the central portion to which the gasket upper portion and the gasket lower portion are connected may be adjusted.

A gasket groove which is recessed along a position corresponding to the central portion may be formed on the inner surface of the gasket.

The gasket may include a gasket upper portion coupled to the gasket fixing member, a gasket lower portion located below the gasket upper portion and coupled to the lower body, and a central portion extending in the vertical direction and connecting the end portions of the gasket upper portion and the gasket lower portion.

A gasket groove which is recessed along the central portion so that the central portion protrudes outward when the gasket is compressed may be formed on the inner surface of the gasket.

A pair of auxiliary gasket grooves recessed along the upper end and the lower end of the central portion may be formed on the inner surface of the gasket, and the gasket groove may be positioned between the pair of auxiliary gasket grooves.

The outer surface of the gasket may be located at the same distance as the circumference surface of the main lid or less than the distance of the circumferential surface of the main lid in the elongated state and may protrude more outward than the circumferential surface of the main lid in the compressed state.

The gasket may be spaced apart from the inner wall surface of the container in an extended state and protrude to be in close contact with the inner wall surface of the container in a compressed state.

A lid for a blender container for opening and closing the opened upper surface of the container seated on the blender according to an embodiment, the lid for the blender container may include an upper body forming an upper portion of the lid, a handle provided on an upper surface of the upper body and manipulated by a user for rotation of the upper body, a lower body coupled to the upper body from a lower side of the upper body and lifted and lowered according to the rotation of the upper body, a gasket fixing member provided between the lower body and the upper body, and a gasket having an upper end fixed to the gasket fixing member and a lower end fixed to the lower body, in which the gasket may protrude according to the lifting and lowering of the lower body and be pressed against and be in contact with an inner surface of the container.

The upper body may be formed with a through-hole communicating with the inside of the container, and the handle may be inserted into the through-hole to shield the through-hole.

The lid for the blender container may further include a lifting and lowering protrusion protruding from an inner surface of the upper body, and a lifting and lowering guide extending obliquely along an outer surface of the lower body and lifting and lowering the lower body by moving in a state of being in contact with the lifting and lowering protrusion when the upper body is rotated.

In the above description, numerous specific details are set forth in order to provide a thorough understanding of the present disclosure. The present disclosure may be practiced without some or all of these specific details. Examples of various embodiments have been illustrated and described above. It will be understood that the description herein is not intended to limit the claims to the specific embodiments described. On the contrary, it is intended to cover alternatives, modifications, and equivalents as may be included within the spirit and scope of the present disclosure.

What is claimed is:

1. A blender comprising:
   a blender main body provided with a motor assembly;
   a container of which an upper surface is opened to form a space in which food is received and which is seatable on the blender main body;
   a blade provided at a bottom surface of the container and connectable to the motor assembly to be rotated when the container is seated;
   a main lid seatable on the container and having a through-hole opened to communicate with an inside of the container; and
   an auxiliary lid insertable into the through-hole and a portion thereof exposed from an upper surface of the main lid when inserted into the through-hole,
   wherein the main lid includes
   an upper body forming an upper portion of the main lid;
   a lower body forming a lower portion of the main lid and coupled to the upper body to be capable of rotating and moving relative to each other and having a lower fixing groove;
   a gasket fixing member provided between the lower body and the upper body, and having an upper fixing groove; and
   a gasket including:
   an upper portion extended to the gasket fixing member to insert into the upper fixing groove;
   a lower portion extended to the lower body to insert into the lower fixing groove; and
   a central portion extending in a vertical direction and connecting the upper portion and the lower portion,
   wherein a gasket groove is formed along an inner surface of the central portion,
   wherein a pair of auxiliary gasket grooves are formed on the inner surface of the gasket which are respectively recessed along an upper end and a lower end of the central portion,
   wherein the gasket groove is positioned between the pair of auxiliary gasket grooves, and
   wherein when the lower body is lifted, the upper portion and lower portion of the gasket are closer and the central portion of the gasket protrudes to press against and make contact with an inner surface of the container.

2. The blender of claim 1,
   wherein the main lid includes a rotation protrusion that protrudes from an inside the through-hole; and the auxiliary lid includes a rotation groove disposed on an outer surface of the auxiliary lid, into which the rotation protrusion is inserted to constrain the auxiliary lid with the main lid.

3. The blender of claim 2, wherein the rotation groove is opened from a lower end of the outer surface of the auxiliary lid and extends in an insertion direction of the auxiliary lid with respect to the main lid.

4. The blender of claim 2, wherein the auxiliary lid includes a lid rib protruding outward along a circumference of the outer surface of the auxiliary lid; and the main lid includes a rib seating portion on which the lid rib is seated and is formed on an upper end of the through-hole, wherein an upper surface of the auxiliary lid protrudes upward more than the upper surface of the main lid in a state where the lid rib is seated on the rib seating portion.

5. The blender of claim 4, wherein the main lid includes a vent hole which is opened in the lid rib corresponding to a position of the rotation groove to allow air inside the container to be discharged to the outside.

6. The blender of claim 1, wherein the upper body includes a lifting and lowering protrusion disposed at and protruding from an inner surface of the upper body; and the lower body includes a lifting and lowering guide disposed at an outer surface of the lower body that is formed to be inclined and guides the lifting and lowering protrusion when the upper body rotates to lift or lower the lower body.

7. The blender of claim 6, wherein a plurality of lifting and lowering protrusions and a plurality of lifting and lowering guides are respectively disposed, and each lifting and lowering protrusion are disposed at opposite positions to each other and each lifting and lowering guide are disposed at opposite positions to each other.

8. The blender of claim 6, wherein the lifting and lowering guide includes an inclined portion extending obliquely along the outer surface of the lower body;

an upper horizontal portion extending horizontally with an upper surface of the lower body at an upper end of the inclined portion; and a lower horizontal portion extending horizontally with the upper surface of the lower body at a lower end of the inclined portion.

9. The blender of claim 6, wherein the lifting and lowering guide includes an inclined portion extending obliquely along the outer surface of the lower body;

an upper constraining portion protruding downward from an upper end of the inclined portion to constrain a downward movement of the lifting and lowering protrusion; and a lower constraining portion protruding downward from a lower end of the inclined portion to constrain an upward movement of the lifting and lowering protrusion.

10. The blender of claim 6, wherein a first side rib and a second side rib extending in a vertical direction are disposed at opposite ends of the lifting and lowering guide, and a rib opening is formed on the second side rib so that the lifting and lowering protrusion can enter and exit the lifting and lowering guide.

11. The blender of claim 10, wherein the lower body includes a protrusion movement passage which is opened at an upper end of the lower body and disposed on a side of the second side rib, and communicates with the rib opening to guide movement of the lifting and lowering protrusion when the upper body and the lower body are assembled.

12. The blender of claim 1, wherein the gasket fixing member is formed in a ring shape and supports a lower end of the upper body.

13. The blender of claim 1, wherein the gasket fixing member includes a fixing member circumferential portion extending in a vertical direction along a circumference of the upper body to form a circumferential surface of the main lid; and a fixing member coupling portion supporting the upper body at a lower end of the fixing member circumferential portion and to which the upper end of the gasket is fixed.

14. A lid for a blender container for opening and closing an opened upper surface of the container that seats on the blender, the lid for the blender container comprising:

an upper body forming an upper portion of the lid;

a handle provided on an upper surface of the upper body and manipulatable by a user for rotation of the upper body;

a lower body coupled to the upper body from a lower side of the upper body, which is lifted or lowered according to the rotation of the upper body, and the lower body having a lower fixing groove;

a gasket fixing member provided between the lower body and the upper body, and having an upper fixing groove; and a gasket provided around the lid, wherein the gasket includes:

an upper portion extended to the gasket fixing member to insert into the upper fixing groove;

a lower portion extended to the lower body to insert into the lower fixing groove; and a central portion extending in a vertical direction and connecting the upper portion and the lower portion, wherein a gasket groove is formed along an inner surface of the central portion, wherein a pair of auxiliary gasket grooves are formed on the inner surface of the gasket which are respectively recessed along an upper end and a lower end of the central portion, wherein the gasket groove is positioned between the pair of auxiliary gasket grooves, and wherein when the lower body is lifted, the upper portion and lower portion of the gasket are closer and the central portion of the gasket protrudes to press against and make contact with an inner surface of the container.

15. The lid for the blender container of claim 14, wherein the upper body is formed with a through-hole to communicate with an inside of the container; and the handle is inserted into the through-hole to shield the through-hole.

16. The lid for a blender container of claim 14, further comprising
- a lifting and lowering protrusion protruding from an inner surface of the upper body; and
- a lifting and lowering guide extending obliquely along an outer surface of the lower body to lift or lower the lower body by moving in a state of being in contact with the lifting and lowering protrusion when the upper body is rotated.

\* \* \* \* \*